(12) United States Patent
Sasaki et al.

(10) Patent No.: US 7,580,222 B2
(45) Date of Patent: Aug. 25, 2009

(54) THIN-FILM MAGNETIC HEAD, A HEAD GIMBAL ASSEMBLY AND HARD DISK DRIVE

(75) Inventors: Yoshitaka Sasaki, Santa Clara, CA (US); Lijie Guan, Milpitas, CA (US); Hiroyuki Ito, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 255 days.

(21) Appl. No.: 10/898,986

(22) Filed: Jul. 27, 2004

(65) Prior Publication Data

US 2005/0280938 A1 Dec. 22, 2005

Related U.S. Application Data

(60) Provisional application No. 60/580,368, filed on Jun. 18, 2004.

(51) Int. Cl.
*G11B 5/127* (2006.01)
*G11B 5/147* (2006.01)

(52) U.S. Cl. .............................. 360/125.06; 360/125.09

(58) Field of Classification Search ............... 360/126, 360/125.02–125.04, 125.16, 125.17, 125.06, 360/125.09, 125.1, 125.56, 125.66
See application file for complete search history.

(56) References Cited

U.S. PATENT DOCUMENTS

| | | | | |
|---|---|---|---|---|
| 4,656,546 | A | 4/1987 | Mallory | 360/125 |
| 4,672,493 | A | 6/1987 | Schewe | 360/110 |
| 6,061,211 | A | 5/2000 | Yoda et al. | |
| 6,457,141 | B1 | 9/2002 | Kim et al. | |
| 6,504,675 | B1 | 1/2003 | Shukh et al. | 360/125 |
| 6,530,141 | B2 * | 3/2003 | Komuro et al. | 29/603.14 |
| 6,728,064 | B2 | 4/2004 | Sato et al. | |
| 6,757,141 | B2 * | 6/2004 | Santini et al. | 360/317 |
| 6,801,407 | B2 | 10/2004 | Sasaki et al. | |
| 6,903,900 | B2 * | 6/2005 | Sato et al. | 360/125.12 |
| 6,952,325 | B2 * | 10/2005 | Sato et al. | 360/125.08 |
| 7,002,775 | B2 | 2/2006 | Hsu et al. | |
| 7,054,105 | B2 * | 5/2006 | Mochizuki et al. | 360/125 |
| 7,102,854 | B2 | 9/2006 | Wang et al. | |
| 7,140,095 | B2 | 11/2006 | Matono | |
| 7,187,519 | B2 | 3/2007 | Stageberg et al. | |

(Continued)

FOREIGN PATENT DOCUMENTS

JP A 2003-203311 7/2003

(Continued)

*Primary Examiner*—Brian E Miller
(74) *Attorney, Agent, or Firm*—Oliff & Berridge, PLC

(57) ABSTRACT

A thin-film magnetic head has a laminated construction comprising a main pole layer having a magnetic pole tip on the side of the medium-opposing surface opposing a recording medium, a write shield layer opposite the magnetic pole tip forming a recording gap layer, on the side of the medium-opposing surface, and a thin-film coil wound around at least a portion of the write shield layer. The main pole layer has the magnetic pole tip with a shortened structure which is not connected to the write shield layer, and an upper yoke pole section and/or lower yoke pole section with a larger size than the magnetic pole tip, and has a joined structure wherein the upper yoke pole section and/or lower yoke pole section is joined to the magnetic pole tip.

16 Claims, 31 Drawing Sheets

U.S. PATENT DOCUMENTS

| | | |
|---|---|---|
| 7,245,454 B2 * | 7/2007 | Aoki et al. ............... 360/125.1 |
| 7,271,982 B2 | 9/2007 | MacDonald et al. |
| 7,453,668 B2 * | 11/2008 | Aoki et al. ............ 360/125.24 |
| 2002/0109946 A1 * | 8/2002 | Sato et al. .................... 360/317 |
| 2003/0021064 A1 * | 1/2003 | Ohtomo et al. ............. 360/126 |
| 2003/0189787 A1 | 10/2003 | Matono et al. |
| 2004/0037002 A1 * | 2/2004 | Kudo et al. ................. 360/126 |
| 2004/0090704 A1 * | 5/2004 | Matono et al. .............. 360/126 |
| 2004/0150912 A1 * | 8/2004 | Kawato et al. .............. 360/126 |

FOREIGN PATENT DOCUMENTS

| | | |
|---|---|---|
| JP | A 2003-242607 | 8/2003 |
| JP | A 2004-097997 | 3/2004 |

* cited by examiner

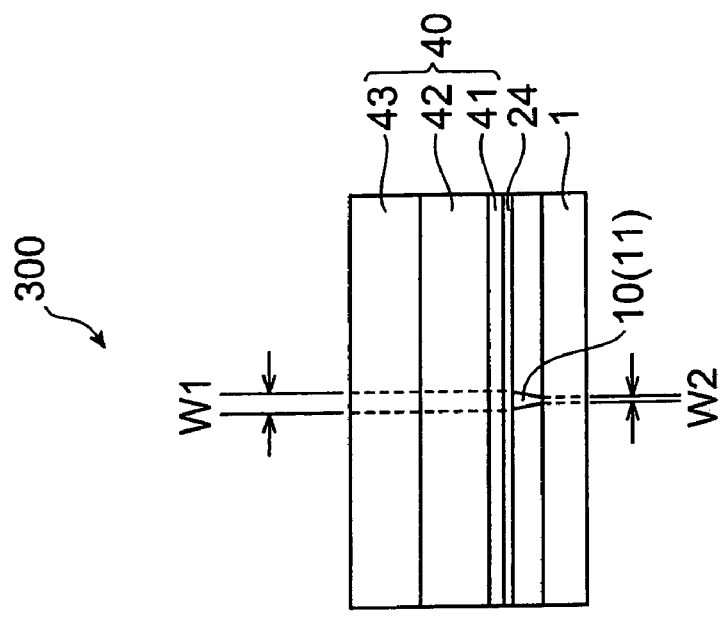
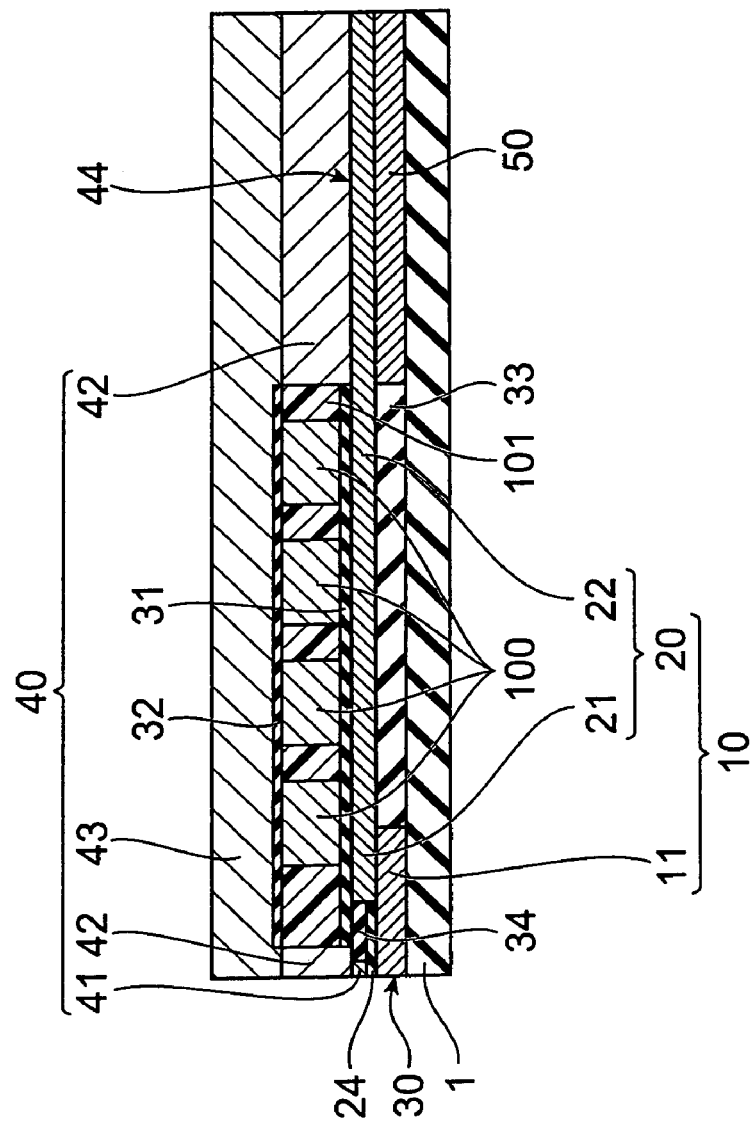
Fig.1(A)
Fig.1(B)

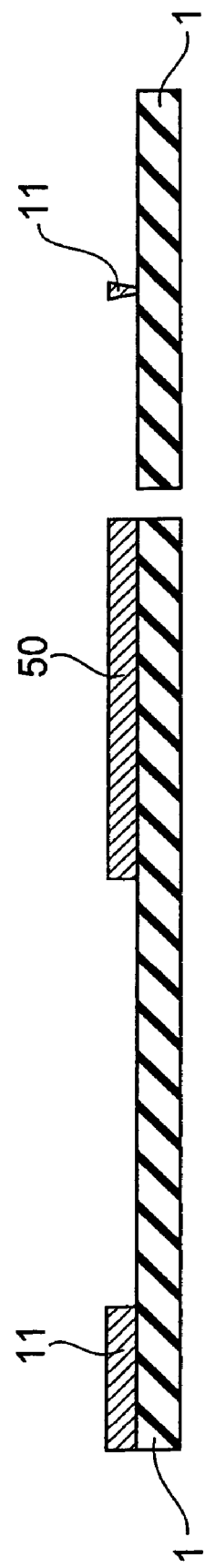

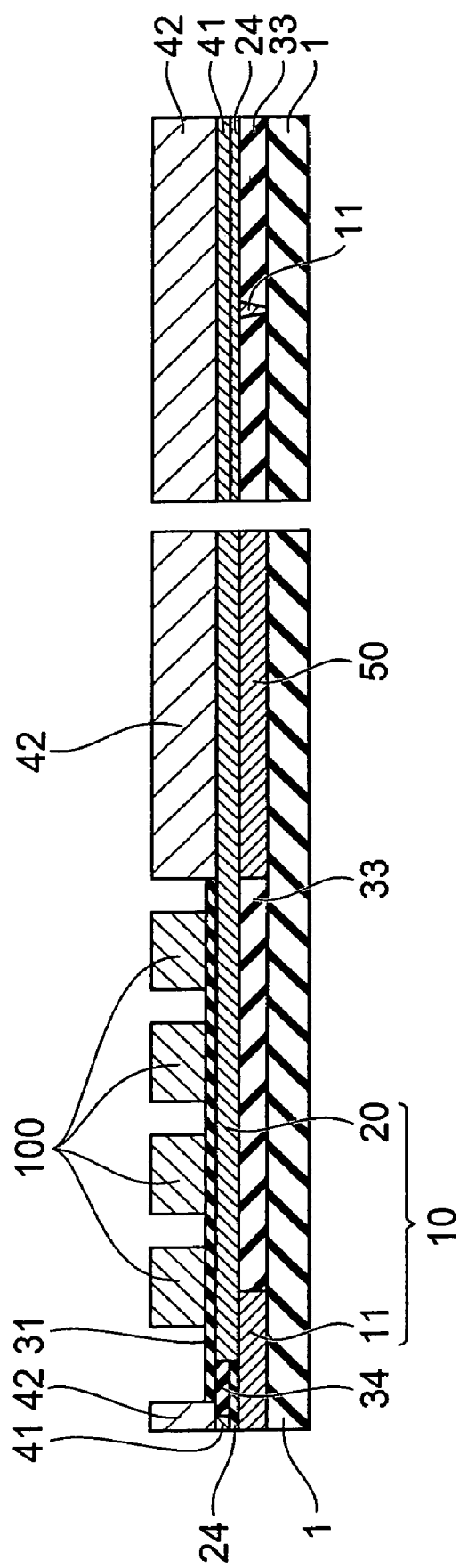

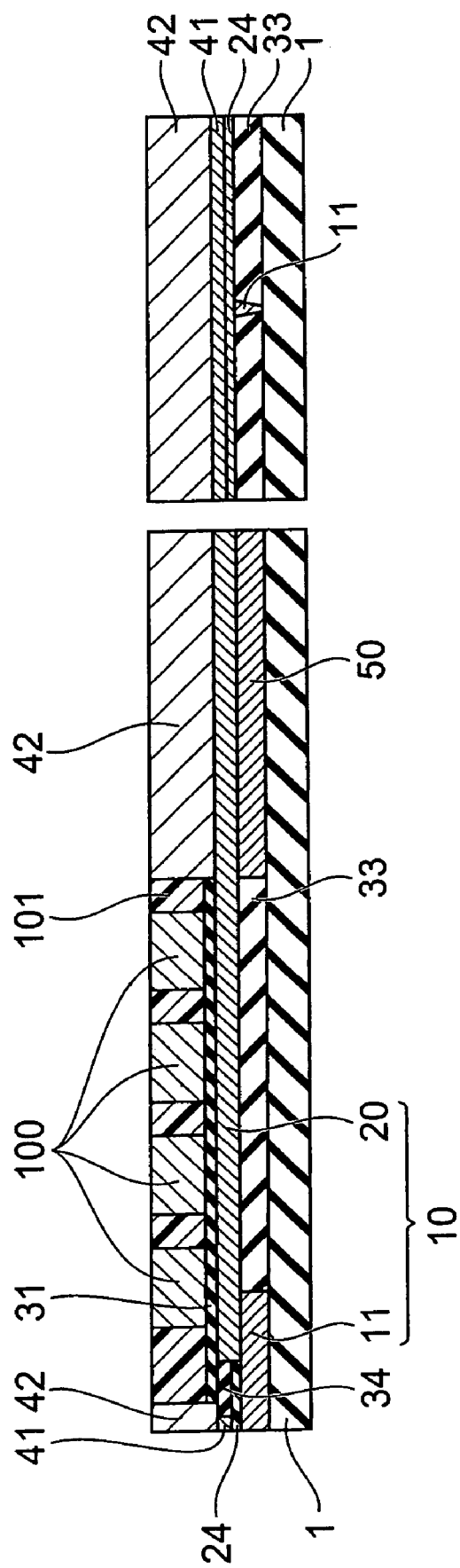

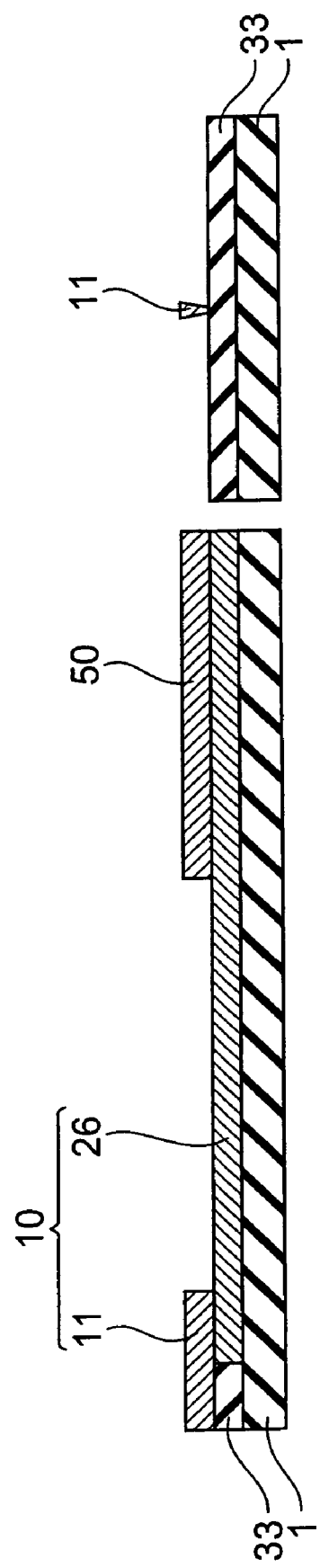

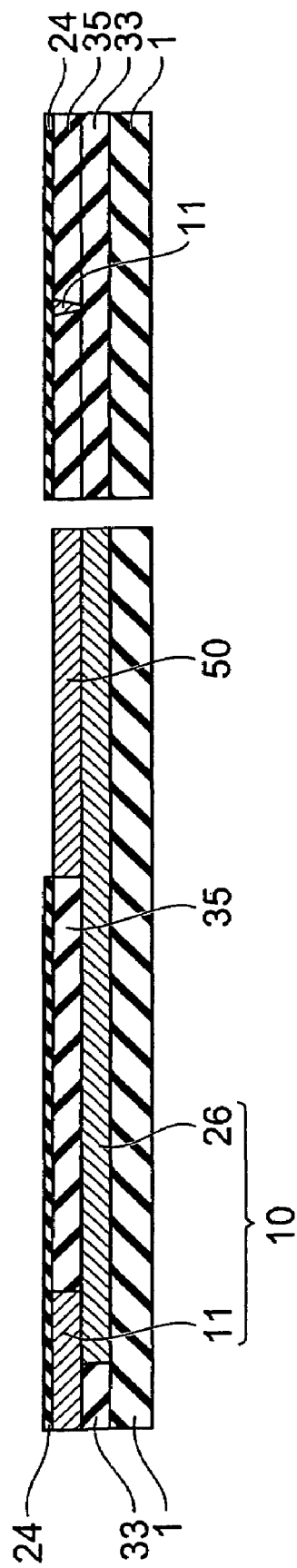

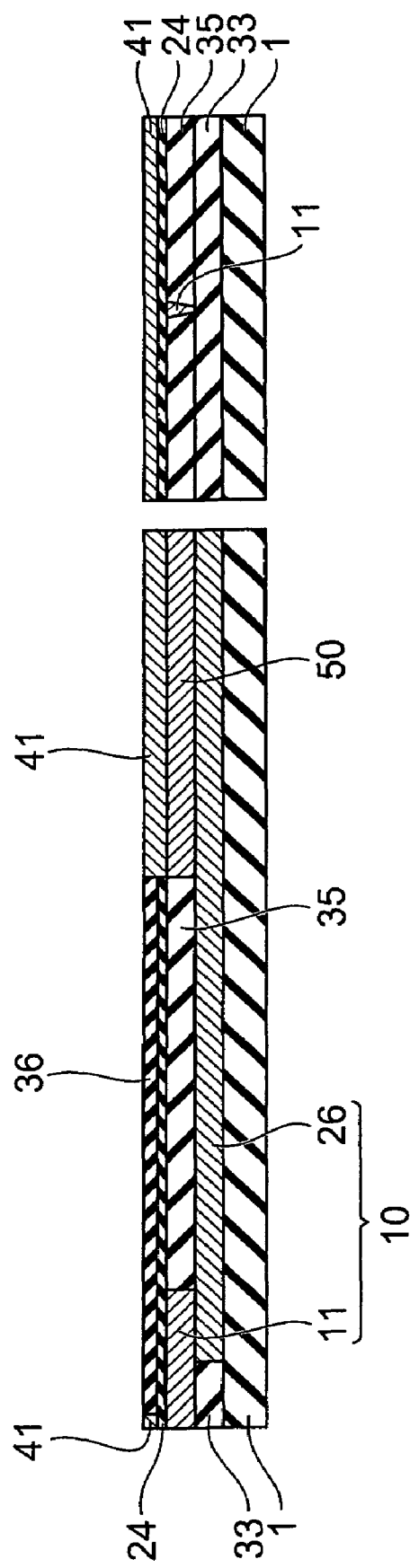

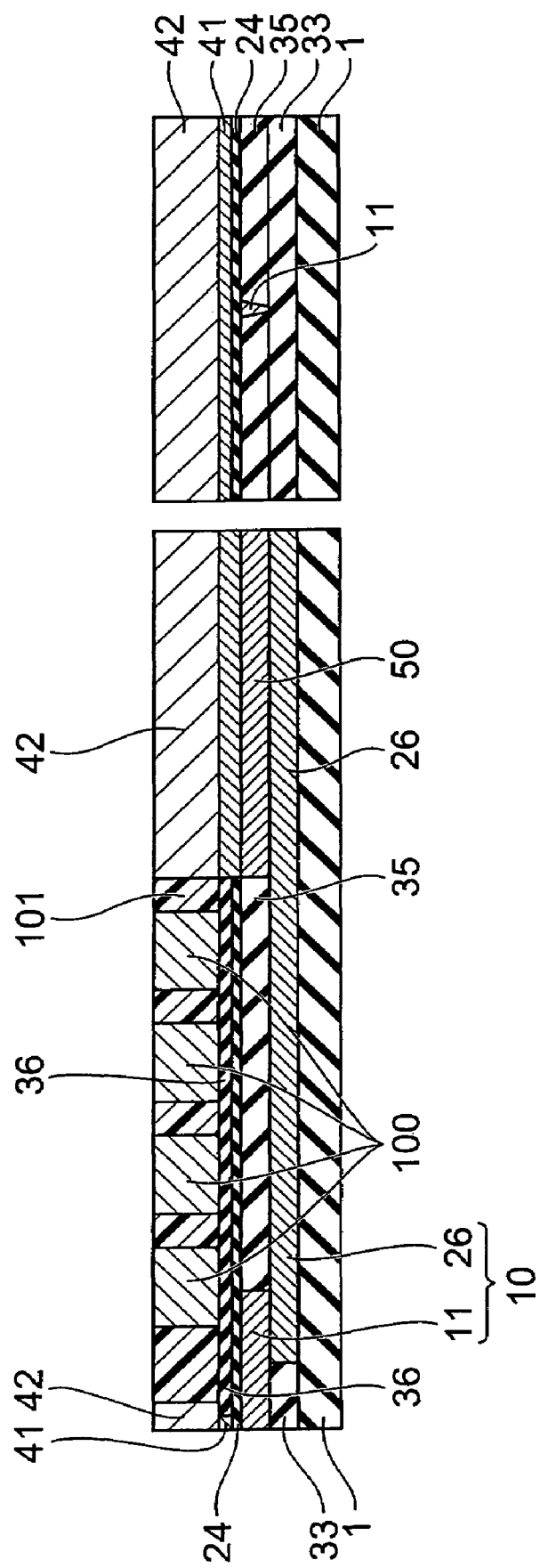

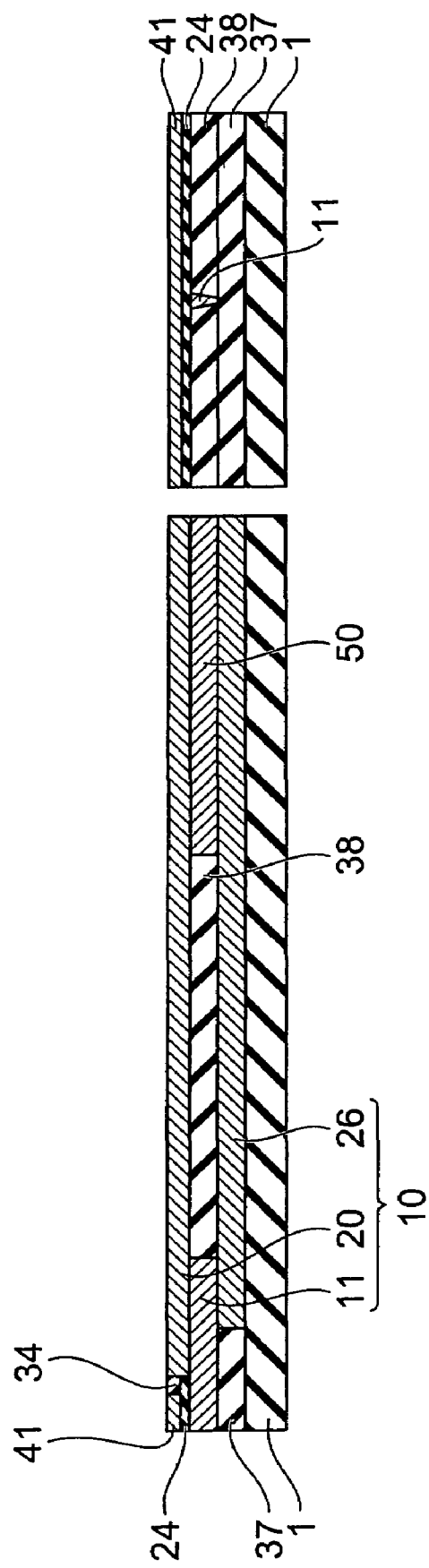

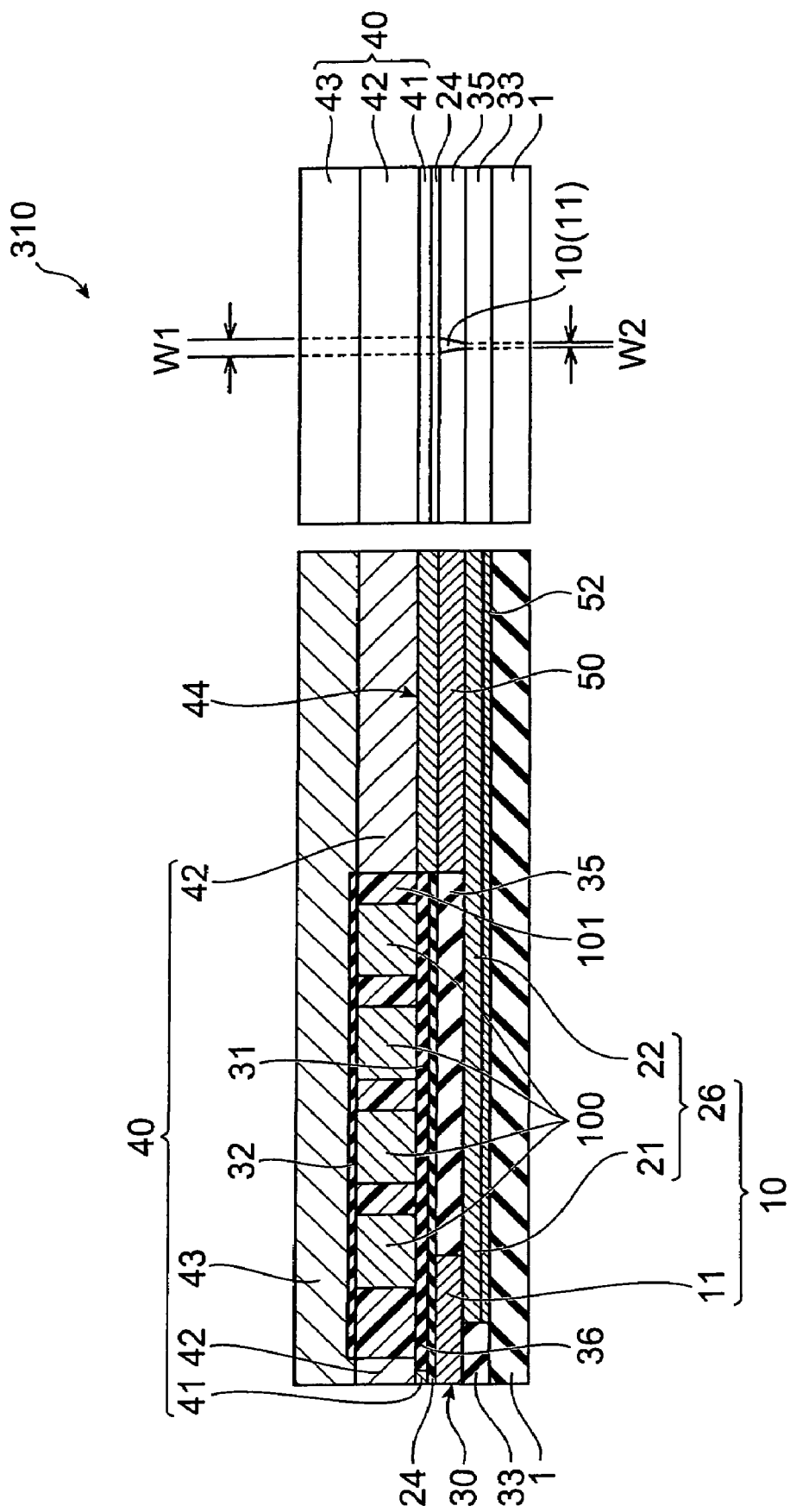

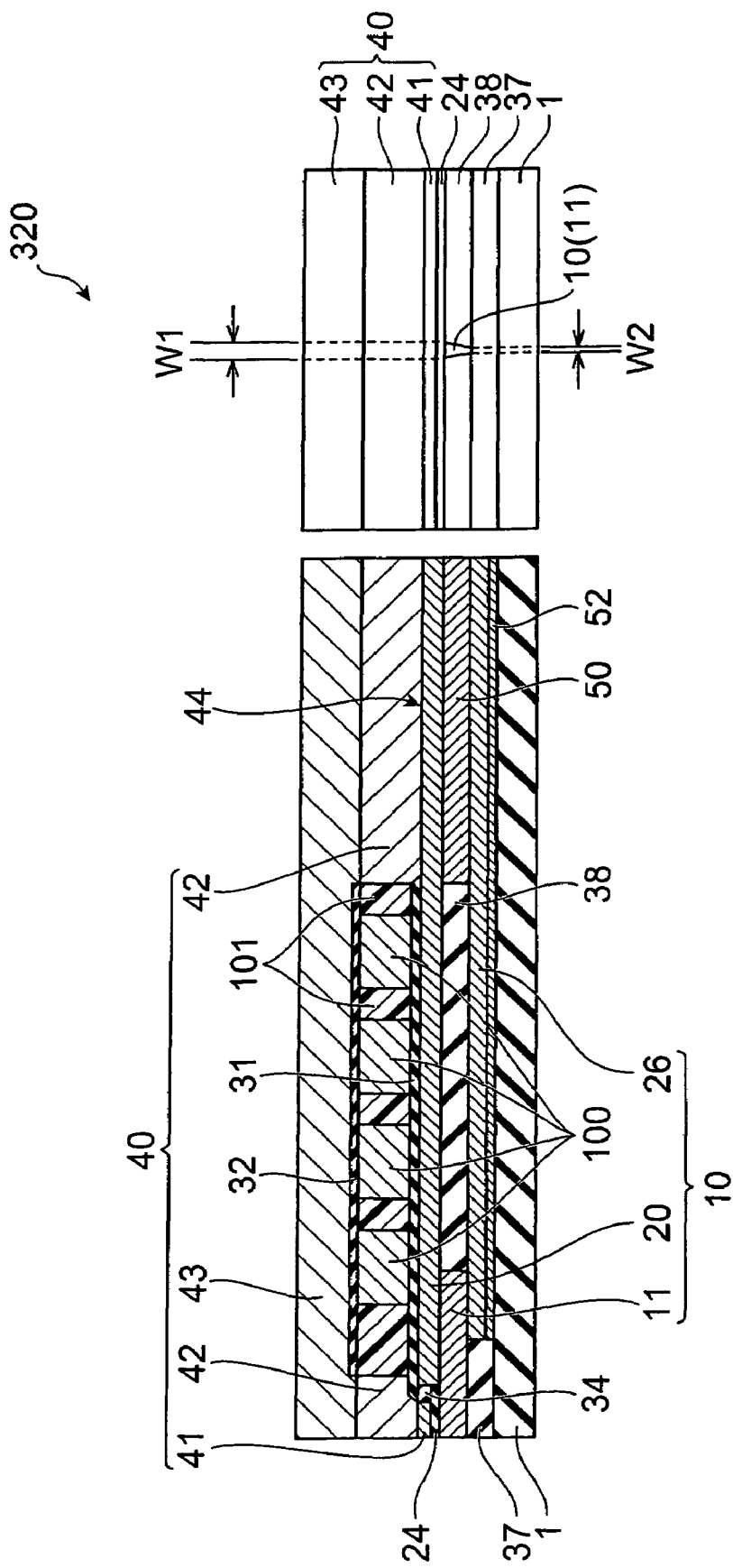

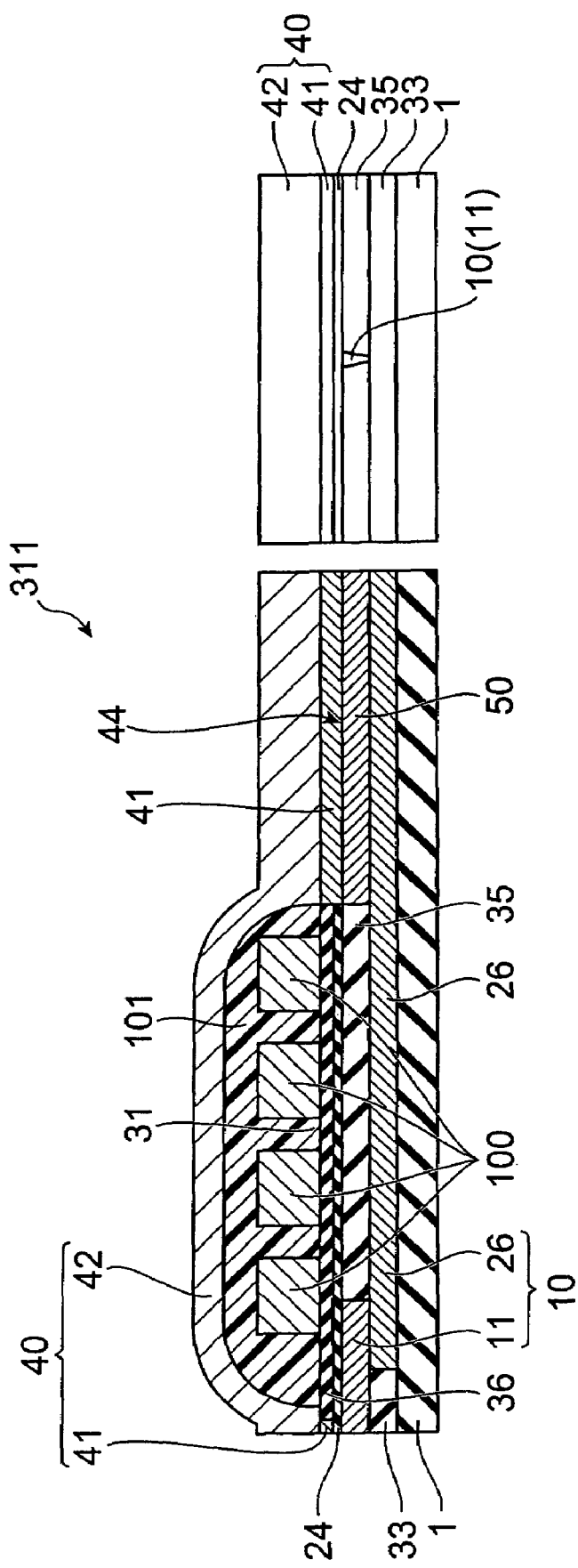

Prior Art
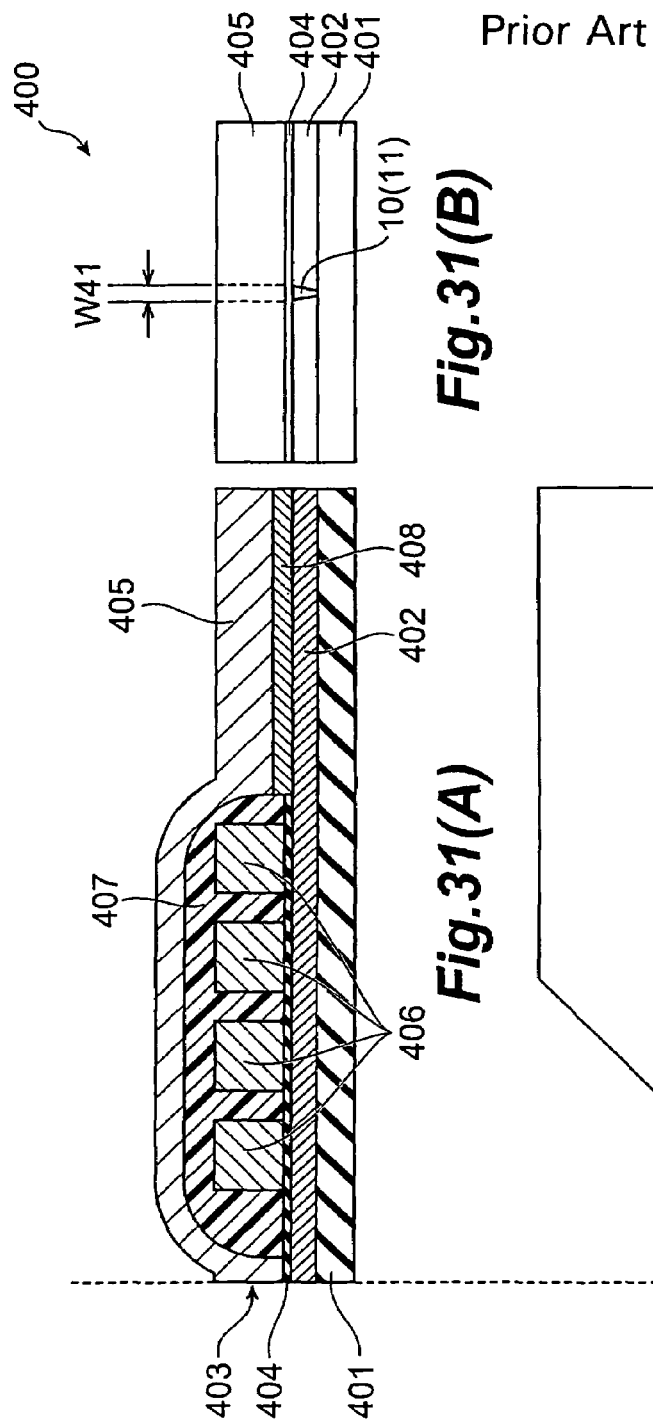
Fig.31(A)
Fig.31(B)
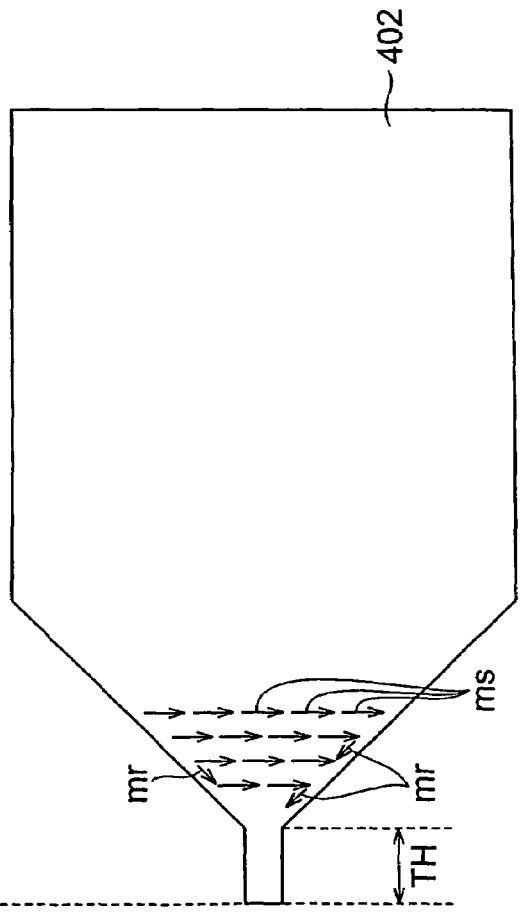
Fig.31(C)

THIN-FILM MAGNETIC HEAD, A HEAD GIMBAL ASSEMBLY AND HARD DISK DRIVE

CROSS REFERENCE TO RELATED APPLICATIONS

This application claims priority to Provisional Application No. 60/580,368, filed on Jun. 18, 2004, which is hereby incorporated by reference in its entirety.

BACKGROUND OF THE INVENTION

1. Field of the Invention

The present invention relates to a thin-film magnetic head which performs magnetic recording operation by a perpendicular recording system, a method of manufacturing the same, a head gimbal assembly and hard disk drive.

2. Related Background Art

Surface recording densities in hard disk drives have improved dramatically in recent years. More particularly, surface recording densities in hard disk drives have recently reached 160-200 Gbytes/platter, and are poised to exceed even this level. At the same time, there has been a demand for improved performance of thin-film magnetic heads.

Thin-film magnetic heads are largely classified based on their recording systems, which may be divided into longitudinal recording systems wherein information is recorded in the (longitudinal) direction within the recording surface of the hard disk (recording medium), and perpendicular recording systems wherein the orientation of recording magnetization formed on the hard disk is formed in the perpendicular direction of the recording surface to record data. Of these types of systems, perpendicular recording type thin-film magnetic heads are capable of realizing markedly higher recording density than longitudinal recording systems, while they also are less susceptible to thermal fluctuation of the recorded hard disk, and are therefore more promising than longitudinal recording systems.

Conventional perpendicular recording type thin-film magnetic heads are disclosed, for example, in U.S. Pat. Nos. 6,504,675, 4,656,546, 4,672,493 and Japanese Unexamined Patent Publication No. 2004-94997.

Incidentally, when thin-film magnetic heads of perpendicular recording systems accomplish recording of data in the inner and outer perimeters of hard disks, the magnetic pole tip situated on the side of the medium-opposing surface (also referred to air bearing surface, or ABS), which opposes the recording medium (hard disk), forms an angle (skew angle) with the data recording track. When the writing performance is high with a perpendicular recording type magnetic head (perpendicular magnetic recording head: hereinafter also referred to as "PMR"), this skew angle is responsible for a problem of side fringe, whereby excess data is recorded between adjacent tracks. When side fringe occurs, it can adversely affect detection of the servo signal, or the S/N ratio of the reproduction waveform. Conventional PMRs therefore have a bevel shape wherein the magnetic pole tip on the ABS side of the main pole gradually narrows in width toward one direction. (In this regard, see Japanese Unexamined Patent Publication No. 2003-242607 and Japanese Unexamined Patent Publication No. 2003-203311.)

SUMMARY OF THE INVENTION

Conventional PMRs include a thin-film magnetic head 400 having the structure shown in FIGS. 31(A), (B) and (C), for example. The thin-film magnetic head 400 comprises a main pole layer 402 which is formed on an insulating layer 401 and has beveled magnetic pole tip disposed the ABS 403 side, a write shield layer 405 magnetically connected with the main pole layer 402, opposite the main pole layer 402 and sandwiching a recording gap layer 404 on the ABS 403 side, and a thin-film coil 406. The thin-film coil 406 is internally insulated each other by a photoresist 407, and is wound in a planar spiral fashion around a connecting member 408 which connects the main pole layer 402 and the write shield layer 405.

In the thin-film magnetic head 400, data recording is accomplished by the recording gap layer 404. The width W41 near the thin-film coil 406 at the ABS 403 of the magnetic pole tip constitutes the track width, and the hard disk recording density is determined by this width W41.

A PMR having a write shield layer opposite the main pole layer 402, as in this thin-film magnetic head 400, has its throat height TH determined by the distance of the photoresist 407 and write shield layer 405 from the ABS 403. Also, since this thin-film magnetic head 400 can absorb magnetic return from the hard disk due to the write shield layer 405, and it has a satisfactory overwrite characteristic (the characteristic for over writing of another data already recorded data on the recording medium), it has become commonly used in PMRs in recent years.

On the other hand, PMRs with narrower track widths are desirable for improved recording density, and a satisfactory overwrite characteristic is preferred. In addition, in order to deal with the problem of the skew angle mentioned above, the bevel-shaped main pole layer 402, as in the thin-film magnetic head 400, has been formed by frame plating by photlithography.

Apart from the issue of the thin-film magnetic head 400, however, recording of information carried out at high density in a conventional PMR results in a phenomenon known as pole erasure, whereby data previously written on the hard disk is erased. Specifically, pole erasure is the phenomenon wherein, after data has been written on a recording medium (hard disk) having a high maximum coercivity Hc, leakage flux flows from the ABS 403 to the hard disk, even in the absence of a write current flow to the thin-film coil, thus erasing other data.

As shown in FIG. 31(C), the main pole layer 402 in the thin-film magnetic head 400 is formed while magnetizing the magnetic material so that the direction of magnetization ms is oriented in the direction along the ABS 403.

However, in a conventional PMR having a structure such as this thin-film magnetic head 400, though the direction of magnetization ms is aligned along the direction of the ABS 403, the direction of remnant magnetization mr inside the main pole layer 402 after completion of writing is oriented toward the ABS 403 side, and therefore faces a different direction than the magnetization ms. (The direction different from the direction along the ABS will hereinafter be referred to as "different direction"). Thus, when data is written by the thin-film magnetic head 400, data already written on the hard disk is erased by leakage flux due to the remnant magnetization mr, even though no write current is flowing, and this weakens the signal of the written data.

In the case of a conventional PMR other than a thin-film magnetic head 400, the main pole layer is preferably a magnetic material with a small maximum coercivity Hc (about 2-10 Oe) and a small magnetostriction λ ($1-3 \times 10^{-6}$), while it is also preferably a magnetic material with a small magnetostriction λ in order to eliminate the aforementioned pole erasure.

However, in order to avoid impairment in the overwrite characteristic which occurs with flux saturation even if the track width is narrowed to improve the recording density, the magnetic material of the main pole layer 402 is preferably formed of a magnetic material with a high saturated flux density, but when this is done it becomes difficult to lower the magnetostriction λ of the main pole layer 402. Consequently, with conventional PMRs such as a thin-film magnetic head 400, it has been difficult to both achieve improved recording density and prevent pole erasure. For this reason, it has been a goal to modify the structure of conventional PMRs to prevent appearance of pole erasure while improving recording density.

It is an object of the present invention, which has been accomplished in light of the problems described above, to provide a thin-film magnetic head having a structure which allows the recording density to be improved while preventing appearance of pole erasure, as well as a method of manufacturing the same, a head gimbal assembly and a hard disk drive.

In order to solve the aforementioned problems, the invention provides a thin-film magnetic head having a laminated construction comprising a main pole layer having a magnetic pole tip on a side of a medium-opposing surface opposing a recording medium, a write shield layer opposing the magnetic pole tip forming a recording gap layer, on the side of the medium-opposing surface, and a thin-film coil wound around at least a portion of the write shield layer, wherein the main pole layer has a magnetic pole tip with a shortened structure which is not connected to the write shield layer, and a yoke pole section with a larger size than the magnetic pole tip, and has a joined structure wherein the yoke pole section is joined to the magnetic pole tip.

The thin-film magnetic head has a joined structure wherein the main pole layer and the yoke pole section with a larger size than the magnetic pole tip are joined.

In the thin-film magnetic head, the magnetic pole tip may have a connector with a variable width structure which the width gradually widens with its distance from the medium-opposing surface, and the yoke pole section is joined to the connector.

Further, the thin-film magnetic head may also have a non-magnetic thin-film comprising a non-magnetic material situated between the connector and the yoke pole section.

The thin-film magnetic head is able to maintain the direction of remnant magnetization of the magnetic pole tip in the direction along the medium-opposing surface side after completion of writing by this non-magnetic thin-film.

Preferably, the magnetic pole tip and the yoke pole section are formed using magnetic materials with different saturated flux densities, and the saturated flux density of the magnetic pole tip is set higher than the saturated flux density of the yoke pole section.

This will allow the saturated flux density of the magnetic pole tip to be higher, to avoid saturation of the flux even when the track width of the magnetic pole tip is narrowed.

In addition, preferably the write shield layer and the yoke pole section are formed using magnetic materials with different saturated flux densities, and the saturated flux density of the write shield layer is set lower than the saturated flux density of the yoke pole section.

In the thin-film magnetic head, a high tensile strength film made of Ta, W, Mo, TiW, TiN, Cr, NiCr, Mo, Ru or SiN is also preferably provided in contact with either or both the magnetic pole tip and the yoke pole section.

The thin-film magnetic head is able to maintain the direction of remnant magnetization of either or both the magnetic pole tip and yoke pole section in the direction along the medium-opposing surface after completion of writing by this high tensile strength film.

The invention further provides a thin-film magnetic head having a mutually laminated construction comprising a main pole layer having a magnetic pole tip on a side of a medium-opposing surface opposing a recording medium, a write shield layer opposing the magnetic pole tip forming a recording gap layer, on the side of the medium-opposing surface, and a thin-film coil wound around at least a portion of the write shield layer, wherein the main pole layer has a magnetic pole tip with a shortened structure which is not connected to the write shield layer, an upper yoke pole section with a larger size than the magnetic pole tip and situated at a position closer to the thin-film coil than the magnetic pole tip, and a lower yoke pole section with a larger size than the magnetic pole tip and situated at a position distant from the thin-film coil than the magnetic pole tip, and has a joined structure wherein the upper yoke pole section and lower yoke pole section are joined to the magnetic pole tip.

In this thin-film magnetic head, as well, the magnetic pole tip may have a connector with a variable width structure which the width gradually widens with its distance from the medium-opposing surface, and the upper yoke pole section and lower yoke pole section are joined to the connector.

Further, the magnetic pole tip and the upper and lower yoke pole sections are formed using magnetic materials with different saturated flux densities, and the saturated flux density of the magnetic pole tip may be set higher than the saturated flux densities of the upper and lower yoke pole sections.

Also, in the thin-film magnetic head, a high tensile strength film is preferably provided in contact with either or both the magnetic pole tip and the lower yoke pole section.

The invention further provides a method of manufacturing a thin-film magnetic head, wherein a thin-film magnetic head is manufactured by laminating a main pole layer having a magnetic pole tip on a side of a medium-opposing surface opposing a recording medium, a write shield layer opposing the magnetic pole tip forming a recording gap layer, on the side of the medium-opposing surface, and a thin-film coil wound around at least a portion of the write shield layer, the method of manufacturing a thin-film magnetic head comprising the following steps (1) to (5).

(1) A step of forming a magnetic pole tip on an insulating film, at the side of the medium-opposing surface, in such a manner that an insulating section is formed on the side distant from the medium-opposing surface, (2) A step of forming the recording gap layer on the magnetic pole tip, in such a manner that the section at the side distant from the medium-opposing surface of the magnetic pole tip is exposed, (3) A step of forming an upper yoke magnetic section in such a manner as to be joined with the location not covered by the recording gap layer of the magnetic pole tip, and to be in contact with the insulating section, to form a main pole layer, (4) A step of forming a thin-film coil in such a manner as to contact the upper yoke pole section of the main pole layer via the insulating film, and (5) A step of forming the write shield layer in such a manner as to oppose the magnetic pole tip via the recording gap layer, and in connection with the upper yoke pole section.

The invention still further provides a method of manufacturing a thin-film magnetic head comprising the following steps (6) to (10) instead of the aforementioned steps (1) to (5).

(6) A step of forming a lower yoke pole section on the insulating film in such a manner that an insulating section is formed on the side of the medium-opposing surface, (7) A step of forming a magnetic pole tip in such a manner as to dispose at the side of the medium-opposing surface, to contact with the insulating section, and to be joined with the side of the medium-opposing surface of the lower yoke pole section, to form the main pole layer, (8) A step of forming a recording gap layer on the main pole layer, in such a manner that the section at the side distant from the medium-opposing surface is exposed, (9) A step of forming the thin-film coil in such a manner as to contact the recording gap layer via the insulating film, and

(10) A step of forming the write shield layer in such a manner as to oppose the magnetic pole tip via the recording gap layer.

The invention still further provides a method of manufacturing a thin-film magnetic head comprising the following steps (11) to (16) instead of the aforementioned steps (1) to (5).

(11) A step of forming a lower yoke pole section on an insulating layer in such a manner that a first insulating section is formed on the side of the medium-opposing surface,

(12) A step of forming a magnetic pole tip in such a manner as to dispose at the side of the medium-opposing surface to contact with the first insulating section, and to be joined with the side of the medium-opposing surface of the lower yoke pole section, so that a second insulating section is formed at the side distant from the medium-opposing surface,

(13) A step of forming a recording gap layer on the magnetic pole tip, in such a manner that the section at the side distant from the medium-opposing surface of the magnetic pole tip is exposed,

(14) A step of forming an upper yoke magnetic section in such a manner as to be joined with the location not covered by the recording gap layer of the magnetic pole tip, and to be in contact with the second insulating section, to form a main pole layer,

(15) A step of forming the thin-film coil in such a manner as to contact the upper yoke pole section of the main pole layer via the insulating film, and

(16) A step of forming the write shield layer in such a manner as to oppose the magnetic pole tip via the recording gap layer, and to contact the upper yoke pole section.

By carrying out each of these steps, it is possible to obtain a thin-film magnetic head wherein the main pole layer has a joined structure in which the main pole layer and the yoke pole section with a larger size than the magnetic pole tip are joined.

The method of manufacturing a thin-film magnetic head as described above may further include a step of subjecting the surface of the magnetic pole tip to annealing.

By carrying out annealing, it is possible to reduce the effect of remnant magnetization inside the magnetic pole tip after completion of writing.

The invention still further provides a head gimbal assembly comprising a thin-film magnetic head formed on a support and a gimbal securing the support, wherein the thin-film magnetic head has a laminated construction comprising a main pole layer having a magnetic pole tip on the side of the medium-opposing surface opposing a recording medium, a write shield layer opposing the magnetic pole tip forming a recording gap layer, on the side of the medium-opposing surface, and a thin-film coil wound around at least a portion of the write shield layer, wherein the main pole layer has the magnetic pole tip with a shortened structure which is not connected to the write shield layer, and a yoke pole section with a larger size than the magnetic pole tip, and has a joined structure wherein the yoke pole section is joined to the magnetic pole tip.

The invention still further provides a hard disk device comprising a head gimbal assembly having a thin-film magnetic head and a recording medium opposing the thin-film recording head, wherein the thin-film magnetic head has a laminated construction comprising a main pole layer having a magnetic pole tip on a side of the medium-opposing surface opposing a recording medium, a write shield layer opposing the magnetic pole tip forming a recording gap layer, on the side of the medium-opposing surface, and a thin-film coil wound around at least a portion of the write shield layer, wherein the main pole layer has a magnetic pole tip with a shortened structure which is not connected to the write shield layer, and a yoke pole section with a larger size than the magnetic pole tip, and has a joined structure wherein the yoke pole section is joined to the magnetic pole tip.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 1(A) is a cross-sectional view of a thin-film magnetic head according to a first embodiment of the invention, in the direction crossing the thin-film coil, and FIG. 1(B) is a front view showing the ABS.

FIG. 5(A) and FIG. 5(B) are cross-sectional views, corresponding to FIGS. 1(A) and (B), for a step of manufacturing a thin-film magnetic head according to the first embodiment.

FIGS. 8(A) and (B) are cross-sectional views showing the steps subsequent to FIGS. 7(A) and (B), respectively.

FIGS. 9(A) and (B) are cross-sectional views showing the steps subsequent to FIGS. 8(A) and (B), respectively.

FIGS. 12(A) and (B) are cross-sectional views showing the steps subsequent to FIGS. 11(A) and (B), respectively.

FIGS. 13(A) and (B) are cross-sectional views showing the steps subsequent to FIGS. 12(A) and (B), respectively.

FIGS. 14(A) and (B) are cross-sectional views showing the steps subsequent to FIGS. 13(A) and (B), respectively.

FIGS. 15(A) and (B) are cross-sectional views showing the steps subsequent to FIGS. 14(A) and (B), respectively.

FIGS. 18(A) and (B) are cross-sectional views showing the steps subsequent to FIGS. 17(A) and (B), respectively.

FIGS. 20(A) and (B) are illustrations showing a modification to the thin-film magnetic head of the first embodiment of the invention, wherein FIG. 20(A) is a cross-sectional view and FIG. 20(B) is a front view showing the ABS.

FIGS. 21(A) and (B) are illustrations showing a modification to the thin-film magnetic head of the second embodiment of the invention, wherein FIG. 21(A) is a cross-sectional view and FIG. 21(B) is a front view showing the ABS.

FIGS. 22(A) and (B) are illustrations showing a modification to the thin-film magnetic head of the third embodiment of the invention, wherein FIG. 22(A) is a cross-sectional view and FIG. 22(B) is a front view showing the ABS.

FIGS. 25(A) and (B) are illustrations showing another modification to the thin-film magnetic head of the first embodiment of the invention, wherein FIG. 25(A) is a cross-sectional view and FIG. 25(B) is a front view showing the ABS.

FIGS. 26(A) and (B) are illustrations showing another modification to the thin-film magnetic head of the second embodiment of the invention, wherein FIG. 26(A) is a cross-sectional view and FIG. 26(B) is a front view showing the ABS.

FIGS. 31(A), (B) and (C) are illustrations of a conventional thin-film magnetic head, wherein FIG. 31(A) is a cross-sectional view and FIG. 31(B) is a front view showing the ABS.

DETAILED DESCRIPTION OF THE PREFERRED EMBODIMENTS

Embodiments of the present invention will now be explained in greater detail with reference to the accompanying drawings.

Constituents identical to each other will be referred to with numerals identical to each other without repeating their overlapping explanations.

First Embodiment (Structure of Thin-Film Magnetic Head)

Figure 2:
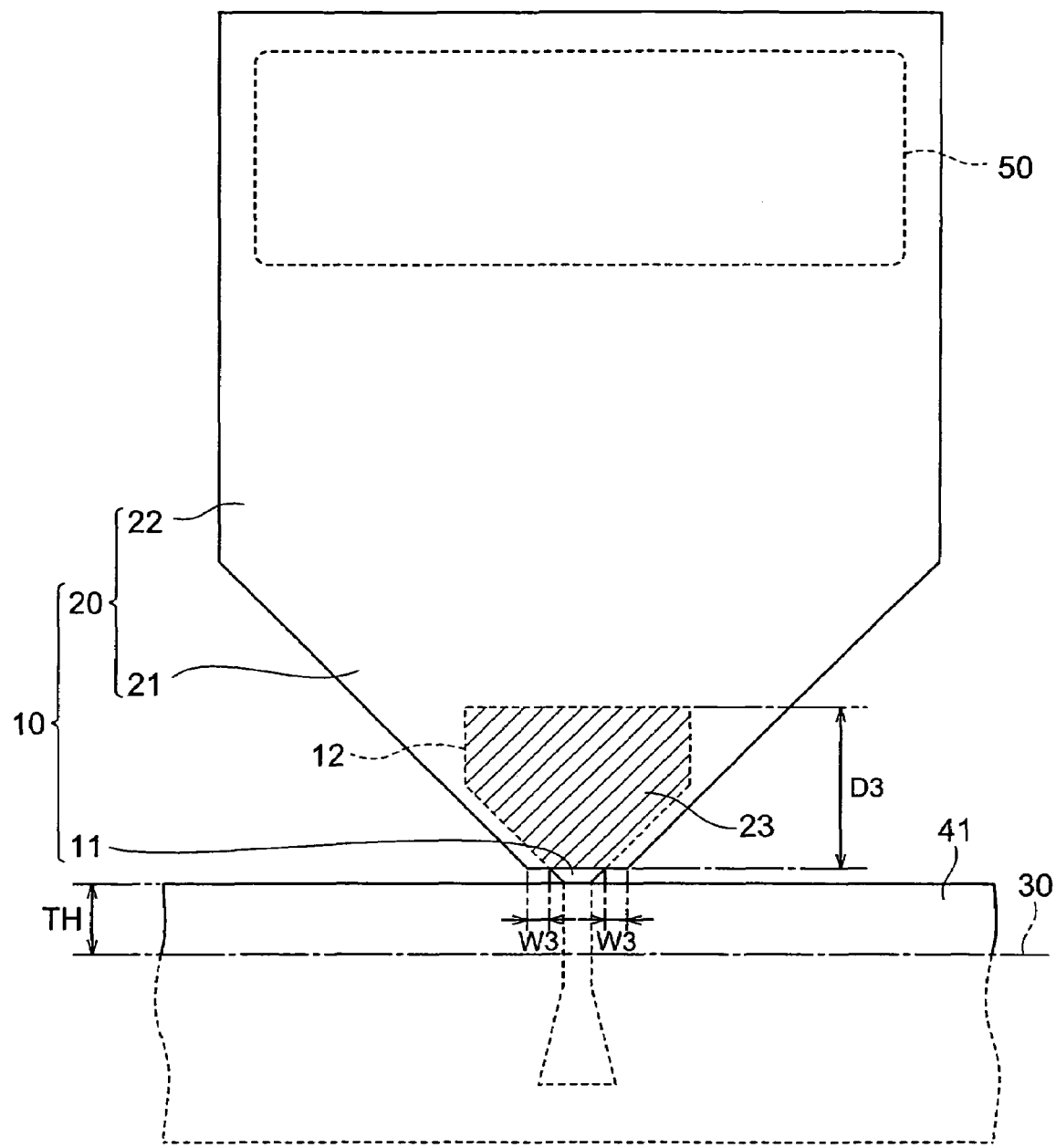
FIG. 2 is a plan view showing the main pole layer and write shield layer of a thin-film magnetic head.
Figure 3:
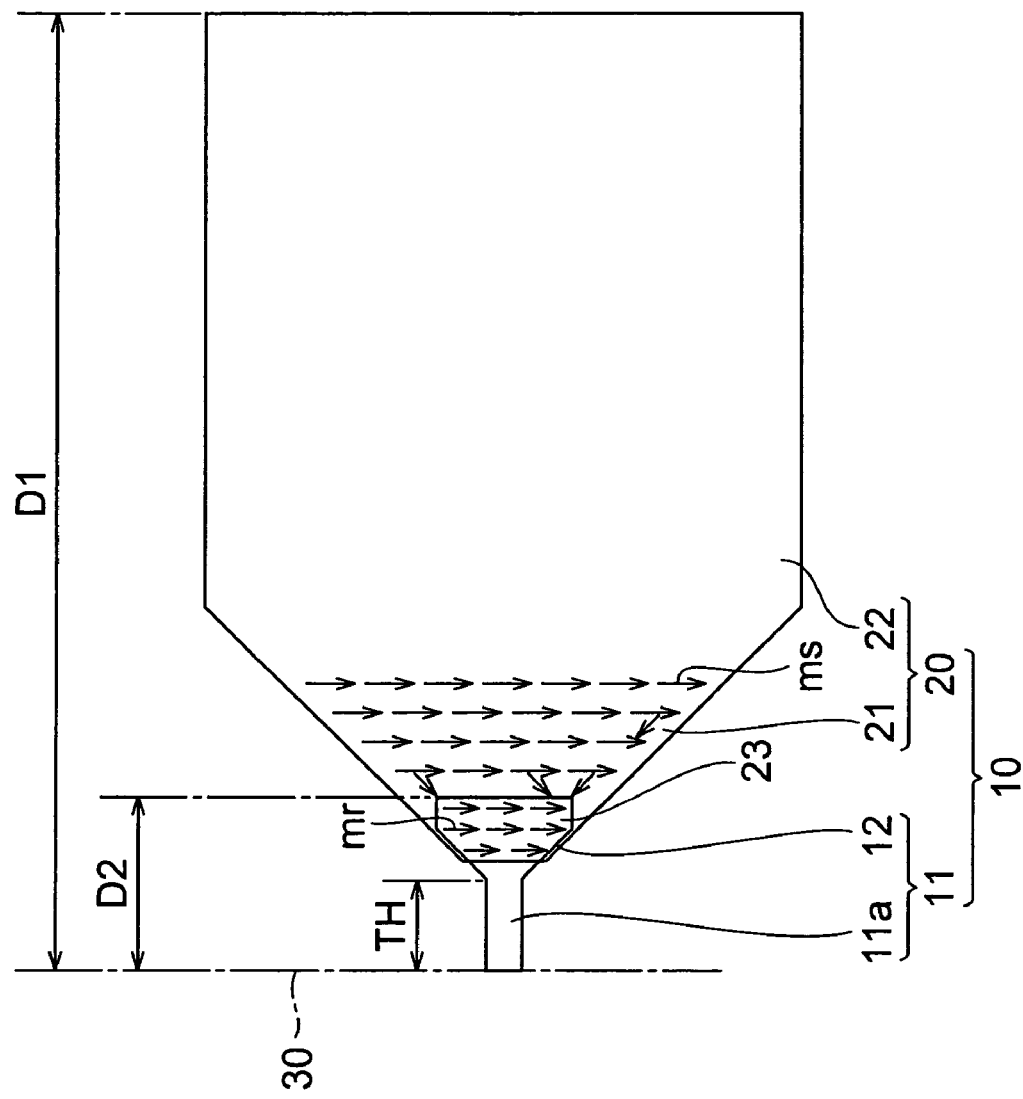
FIG. 3 is a plan view showing the main pole layer and the direction of internal magnetization.
Figure 4:
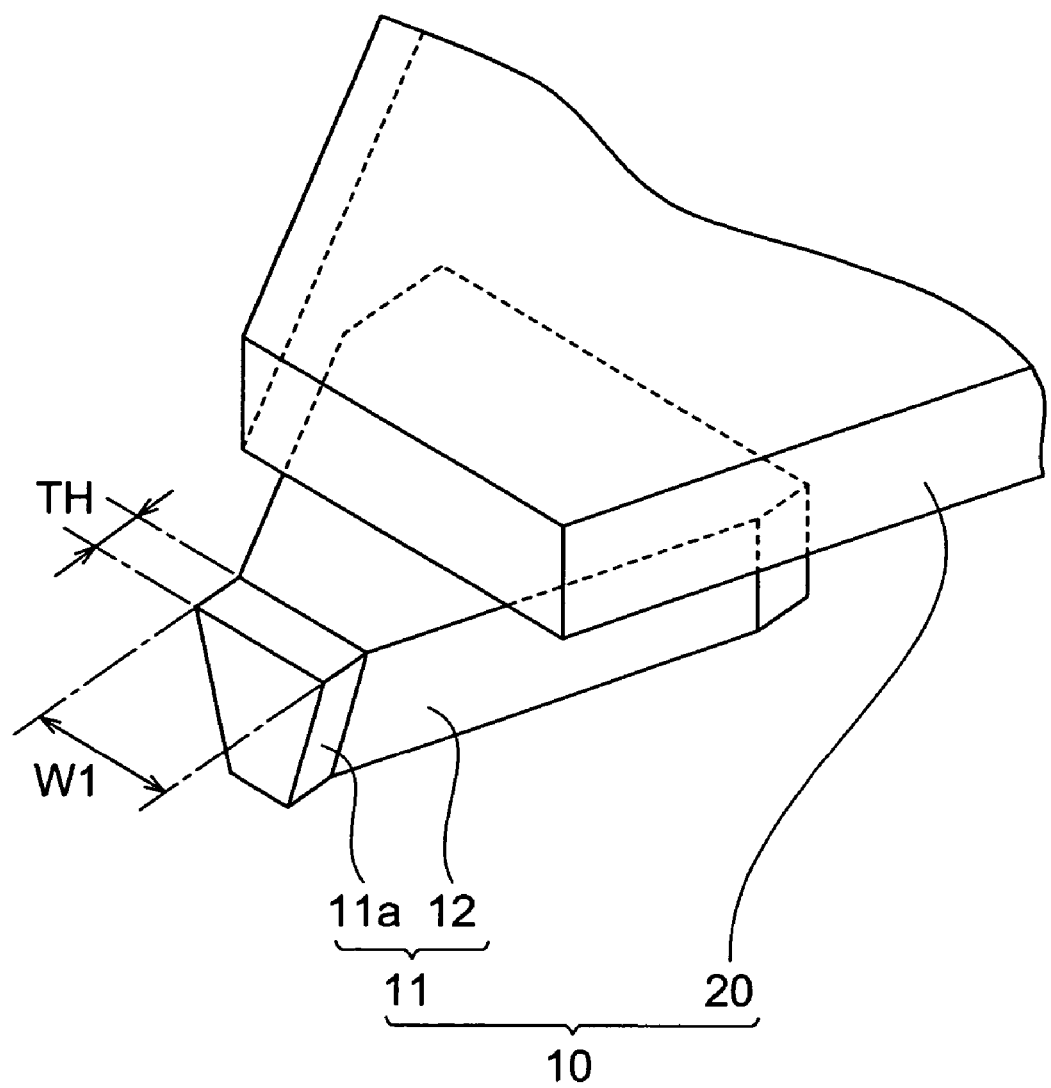
FIG. 4 is a perspective view showing the joint section of the magnetic pole tip and upper yoke pole section of the main pole layer.

The structure of a thin-film magnetic head according to the first embodiment of the invention will be explained first, with reference to FIGS. 1 to 4. FIG. 1(A) is a cross-sectional view of a thin-film magnetic head 300 according to a first embodiment of the invention, in the direction crossing the thin-film coil, and FIG. 1(B) is a front view showing the ABS, FIG. 2 is a plan view showing the main pole layer 10 and first shield section 41 of the thin-film magnetic head 300, FIG. 3 is a plan view showing the main pole layer 10 with the direction of internal magnetization, and FIG. 4 is a perspective view showing the joint section of the magnetic pole tip 11 and upper yoke pole section 20 of the main pole layer 10.

The thin-film magnetic head 300 according to the first embodiment is a perpendicular recording type magnetic head having an ABS 30 as the medium-opposing surface opposite the recording medium (hard disk), and it comprises a substrate, a reproduction head with an MR element (magnetoresistance effect element), etc. laminated on the substrate, and recording head. FIGS. 1(A) and (B) show the recording head laminated on an insulating layer 1, but the substrate and reproduction head are not shown. The construction of the essential parts of the thin-film magnetic head 300 is explained below, while the construction of the other parts will be explained afterwards in connection with the manufacturing steps.

The recording head comprises a main pole layer 10, a recording gap layer 24, a write shield layer 40, a back magnetic pole layer 50 and a thin-film coil 100, and is constructed with these elements laminated on the insulating layer 1 on the substrate, which is not shown.

The main pole layer 10 has a magnetic pole tip 11 and an upper yoke pole section 20, and level difference junction structure which the upper yoke pole section 20 is joined to the magnetic pole tip 11 to produce a difference in level.

The magnetic pole tip 11 has a shortened structure so that it is not connected to the write shield layer 40, and it is magnetized in the direction along the ABS 30, using a magnetic material (Hi-Bs material) having a higher saturated flux density than the upper yoke pole section 20 (see FIG. 3).

The magnetic pole tip 11 is situated at the ABS 30 side, and comprises a track width specifier 11a which has a fixed width and specifies the track width, and a connector 12. As shown in FIG. 1B, the track width specifier 11a at the ABS 30 has a lateral width W1 near the thin-film coil 100 in the direction along the ABS 30 and a lateral width W2 distant from the thin-film coil 100, and has a beveled shape such that its lateral width gradually narrows with the distance from the thin-film coil 100 (W1>W2, where the lateral width W1 is the track width). As shown in FIGS. 2 to 4, the depth of the track width specifier 11a (the distance from the ABS 30) corresponds to the throat height TH. (For this embodiment, the throat height TH is about 0.1-0.3 μm, and preferably 0.25 μm.)

In order to increase the data recording density with the thin-film magnetic head 300, the magnetic pole tip 11 has a narrow track width structure wherein the lateral width W1 is narrowed, and a magnetic material having a higher saturated flux density than the upper yoke pole section 20 is used so that flux saturation does not occur even with the narrowed track width structure. (This will be explained in detail below.)

The connector 12 is formed integrally using the same magnetic material as the magnetic pole tip 11, and it is formed with a shortened depth from the ABS 30 so that it does not contact with the write shield layer 40. The connector 12 is formed for connection between the magnetic pole tip 11 and the upper yoke pole section 20, and shown in FIGS. 2 to 4, and particularly FIG. 3, it has a variable width structure wherein the lateral width in the direction along the ABS 30 gradually widens to be larger than the track width specifier 11a, with increasing distance from the ABS 30. Also, the connector 12 is joined to the upper yoke pole section 20 at a portion of a certain size at the side distant from the ABS 30.

The magnetic pole tip 11 has a depth D2 from the ABS 30 to the rear edge of the connector 12 which is shorter than the depth D1 from the ABS 30 to the rear edge of the upper yoke pole section 20, and thus has a shortened structure which is not connected to the write shield layer 40.

The upper yoke pole section 20 is formed having a larger size (area) than the magnetic pole tip 11, and it is situated at the far side from the recording gap layer 24. The upper yoke pole section 20 is also situated at a location (top) nearer the thin-film coil 100 than the magnetic pole tip 11. The upper yoke pole section 20 has a variable width region 21 wherein the lateral width in the direction along the ABS 30 gradually widens with increasing distance from the ABS 30, and a fixed width region 22 which is fixed.

The variable width region 21 contains a region (the broken line section in FIG. 2, hereinafter referred to as "stitched AREA") 23 wherein an area of a certain size at the ABS 30 side is joined to the connector 12 of the magnetic pole tip 11. The fixed width region 22 is magnetically connected to the write shield layer 40 at a location corresponding to the back magnetic pole layer 50, and it forms a connecting section 44 together with the write shield layer 40.

Also, the thin-film coil 100 is formed extending the variable width region 21 and fixed width region 22 of the upper yoke pole section 20, via the insulating film 31. The stitched AREA 23 has a depth D3 of about 0.5-1.5 μm (see FIG. 2), and a lateral width W3 of about 0.5 μm protruding outward from the connector 12.

The recording gap layer 24 is formed between the main pole layer 10 and the first shield section 41 (described hereunder) of the write shield layer 40.

The write shield layer 40 has a first shield section 41, a second shield section 42 and a third shield section 43. The first shield section 41 is formed opposing the magnetic pole tip 11 of the main pole layer 10 via the recording gap layer 24 at the ABS 30, and its throat height TH is determined by the depth in the direction crossing the ABS 30. The second shield section 42 is formed in connection with the first shield section 41 and the upper yoke pole section 20 from the side near the thin-film coil 100, and has a height equal to the thickness of the thin-film coil 100. The third shield section 43 is formed in connection with the second shield section 42, covering the thin-film coil 100 and photoresist 101 via the insulating layer 32.

The back magnetic pole layer 50 is distant from the ABS 30 and is connected to the upper yoke pole section 20 from the side distant from the thin-film coil 100 at a location corresponding to the link section 44.

The thin-film coil 100 are wound in a planar spiral fashion around the write shield layer 40, while insulated with respect to the upper yoke pole section 20 and write shield layer 40 via the respective insulating layers 31, 32.

The thin-film magnetic head 300 having the construction described above has a recording head with the main pole layer 10 described above, and the main pole layer 10 has a level difference junction structure wherein the upper yoke pole section 20 is joined to the magnetic pole tip 11 with a shortened structure to produce a difference in level.

In order to increase the data recording density, the lateral width W1 of the track width specifier 11a of the magnetic pole tip 11 is narrowed to create a narrow track width structure, and the magnetic pole tip 11 is formed using a magnetic material with a higher saturated flux density than the upper yoke pole section 20 so that the flux is not saturated. With the magnetic pole tip 11 in this relationship, the saturated flux density of the magnetic material is higher than the upper yoke magnetic section 20, and it is difficult to reduce the magnetostriction λ. Consequently, even if the direction of magnetization is aligned along the direction ABS 30, the orientation of the remnant magnetization after completion of writing is toward the ABS 30 side and is therefore oriented in different direction which is different from the direction of magnetization.

However, in the thin-film magnetic head 300, even though the magnetic material of the magnetic pole tip 11 is a magnetic material with a high saturated flux density, it has a shortened structure with a short depth, while a magnetic material with a low saturated flux density is used for the upper yoke magnetic section 20 with a large size. In addition, by joining the upper yoke pole section 20 to the magnetic pole tip 11, a main pole layer 10 is formed having a level difference junction structure. Since the upper yoke pole section 20 is made of a magnetic material having a lower saturated flux density than the magnetic pole tip 11, and the magnetostriction λ is reduced, if the direction of magnetization ms is oriented in the direction along the ABS 30, the direction of remnant magnetization after completion of writing is not directed in the different direction.

Also, since the stitched AREA 23 of this upper yoke pole section 20 is joined to the magnetic pole tip 11, the direction of remnant magnetization mr inside the connector 12 after completion of writing is corrected by the magnetization ms of the upper yoke pole section 20, and is not directed in the different direction as shown in FIG. 3.

That is, by joining the stitched AREA 23 to the connector 12, as if the upper yoke pole section 20 becomes "stitched" to the magnetic pole tip 11, so that the direction of remnant magnetization mr of the magnetic pole tip 11 after completion of writing is corrected by the magnetization ms, and the direction of remnant magnetization mr is aligned in the same direction as the magnetization ms. Thus, the thin-film magnetic head 300 can therefore have improved recording density while effectively preventing pole erasure.

In addition, since the magnetic pole tip 11 has a shortened structure and its size (area) is smaller than the upper yoke pole section 20, the magnetic charge (also known as magnetic volume) of the magnetic pole tip 11 is smaller than the magnetic charge of the upper yoke pole section 20. Consequently, the remnant magnetization mr of the magnetic pole tip 11 is smaller than the upper yoke pole section 20, and leakage flux of the remnant magnetization mr after completion of writing is also reduced. From this standpoint as well, it is possible to effectively prevent appearance of pole erasure.

Modification Example 1

Figures 20A, 20B:
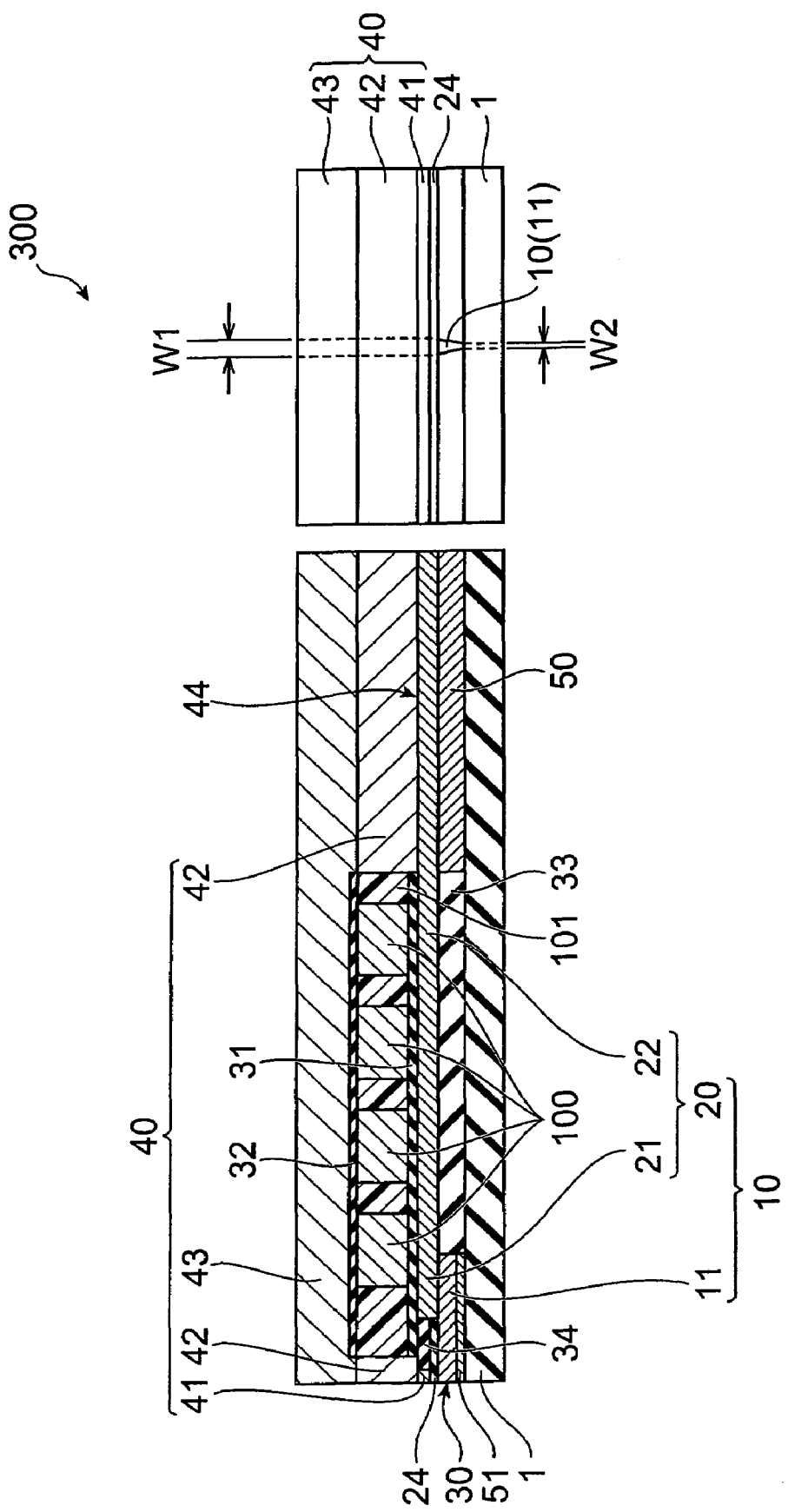

The thin-film magnetic head 300 may also have a tensile film 51 between the insulating layer 1 and the magnetic pole tip 11, as shown in FIGS. 20(A) and (B). The tensile film 51 is a high tensile strength film made of Ta, W, Mo, TiW, TiN, Cr, NiCr, Mo, Ru, SiN or the like, and formed with application of a high tensile strength of 200 MPa or greater. By providing the tensile film 51 it is possible to maintain the direction of remnant magnetization mr of the magnetic pole tip 11 after completion of writing in the direction along the ABS 30, so that it is not directed in the different direction.

Thus, the thin-film magnetic head 300 can have improved recording density while even more effectively preventing appearance of pole erasure.

Modification Example 2

Figure 23:
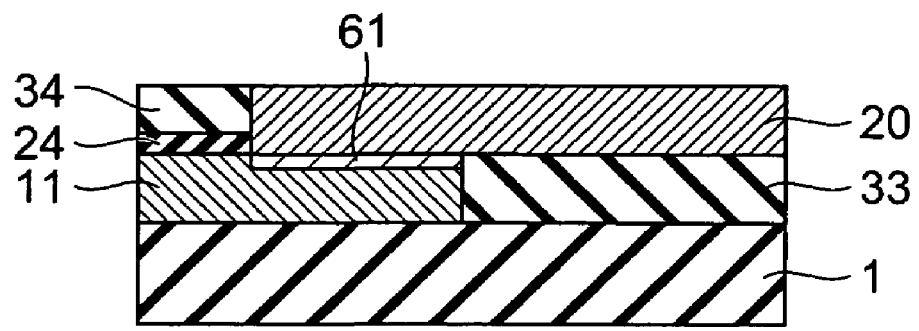
FIG. 23 is a cross-sectional view showing another modification to the thin-film magnetic head of the first embodiment of the invention.

The thin-film magnetic head 300 may have a non-magnetic film 61 between the magnetic pole tip 11 and upper yoke pole section 20, as shown in FIG. 23. The non-magnetic film 61 is made of Ru, Ta, W, Cr or the like. Even with this non-magnetic film 61, it is possible to prevent the direction of remnant magnetization mr of the magnetic pole tip 11 from being directed in the different direction. Thus, the thin-film magnetic head 300 can have improved recording density while even more effectively preventing appearance of pole erasure.

(Method of Manufacturing Thin-Film Magnetic Head)

A method of manufacturing the thin-film magnetic head 300 according to the first embodiment having the construction described above will now be explained with reference to FIGS. 1(A), (B) to FIG. 4 and FIGS. 5(A), (B) to FIGS. 9(A), (B)

FIGS. 5(A), (B) to FIGS. 9(A), (B) show cross-sectional views of manufacturing steps corresponding to FIGS. 1(A), (B), respectively.

In the manufacturing method of this embodiment, first a reproduction head provided with an MR element (magnetoresistance effect element), etc. is laminated on a substrate (not shown) made of, for example, aluminum oxide/titanium carbide ($Al_2O_3.TiC$), and an insulating layer 1 separating the reproduction head and recording head is formed to a thickness of, for example, about 0.2-0.3 µm.

Next, the insulating layer 1 is coated with a photoresist and a prescribed photomask is used for patterning to form a resist pattern with a taper angle of 5-12° on the ABS 30. The resist pattern is used for plating with CoFe or CoNiFe as the magnetic material having a high saturated flux density of 2.3 T-2.4 T to a thickness of about 0.6-0.8 µm, to form a magnetic pole tip 11 and back magnetic pole layer 50. The electrode film (not shown) formed for the plating is then removed, leaving the condition shown in FIGS. 5(A), (B).

Figures 6A, 6B:
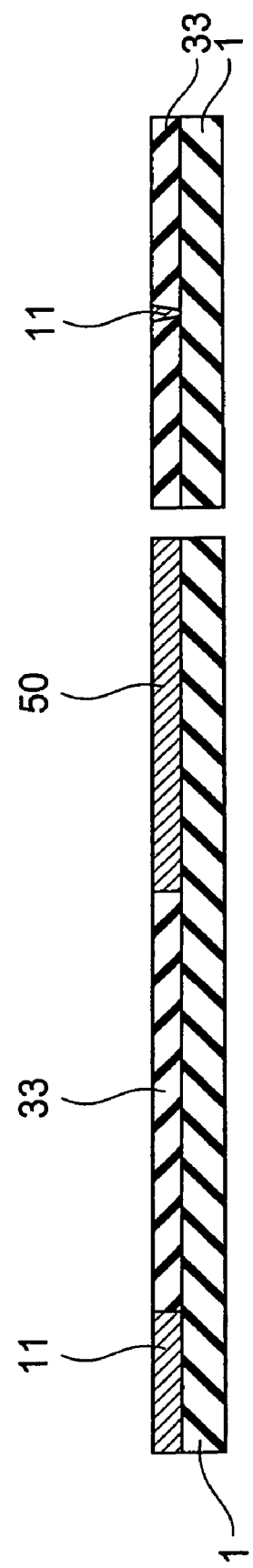
FIGS. 6(A) and (B) are cross-sectional views showing the steps subsequent to FIGS. 5(A) and (B), respectively.

Next, an insulating section 33 made of alumina ($Al_2O_3$) is formed to a thickness of, for example, 0.5-1.0 µm on the entire surface of the laminated body, and the surface is polished by chemical mechanical polishing (hereinafter "CMP") so as to a magnetic pole tip 11 become height (insulating section 33 thickness) of about 0.2-0.3 µm, as shown in FIGS. 6(A), (B), for surface flattening treatment. This results in the condition shown in FIGS. 6(A), (B), with the insulating section 33 at the side distant from the ABS 30 and the insulating section 33 situated at a location where the magnetic pole tip 11 and back magnetic pole layer 50 are absent.

Either before or after the polishing by CMP, the surface of the magnetic pole tip 11 may be subjected to annealing at 200-260° C. Annealing can reduce the effect of remnant magnetization mr inside the magnetic pole tip 11 after completion of writing. The annealing is preferably carried out after formation of the recording gap layer 24 described hereunder.

Figures 7A, 7B:
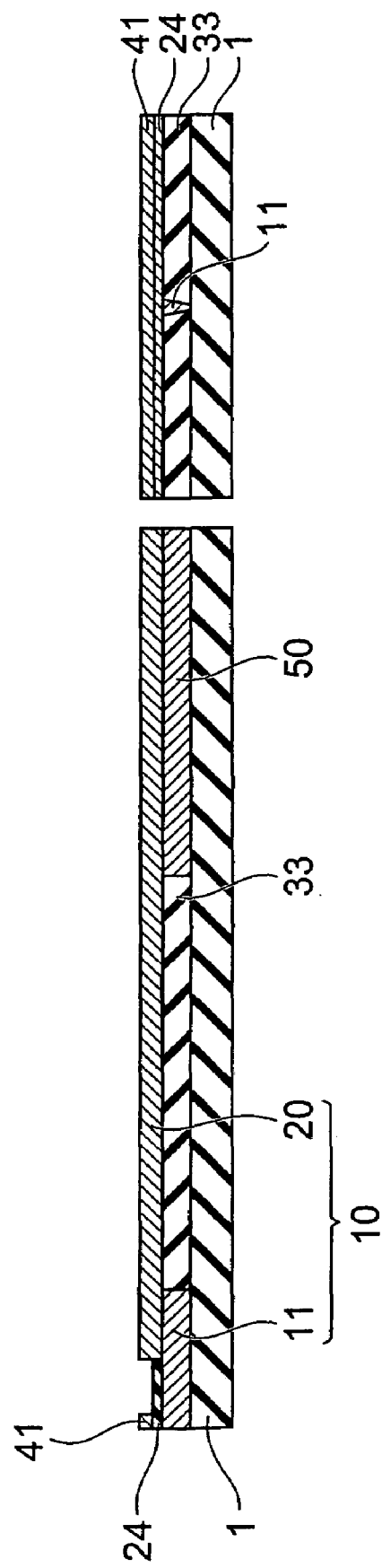
FIGS. 7(A) and (B) are cross-sectional views showing the steps subsequent to FIGS. 6(A) and (B), respectively.

Next, a coating is formed over the entire top surface of the laminated body to 400-500 Å, to form a recording gap layer 24. The material of the coating may be an insulating material such as alumina or the like, or a non-magnetic metal material such as Ru, NiCu, Ta, W, Cr, $Al_2O_3$, $Si_2O_3$ or the like. The coating is then selectively etched to leave a region at the ABS 30 side, and expose a section of the side distant from the ABS 30 of the magnetic pole tip 11. This results in formation of a recording gap layer 24 such as shown in FIGS. 7(A), (B).

A plating method is used to form an upper yoke pole section 20 over the entire surface of the laminated body to a thickness of about 0.3-1.0 µm, using NiFe having a saturated flux density of 1.0-1.6 T or CoNiFe having a saturated flux density of 1.9-2.1 T and a small magnetostriction λ and maximum coercivity Hc as the magnetic material. The upper yoke pole section 20 is formed so that it is joined to the location of the magnetic pole tip 11 which is not covered with the recording gap layer 24, and to the back magnetic pole layer 50, and is in contact with the insulating section 33. Formation of the upper yoke pole section 20 results in formation of a main pole layer 10.

When forming the upper yoke pole section 20, a first shield section 41 is formed at a position which determines the throat height TH, so that it opposes the magnetic pole section 11 via the recording gap layer 24 at the ABS 30. The first shield section 41 may be formed by a plating method using as the magnetic material the same CoNiFe or NiFe as for the upper yoke pole section 20. A magnetic material such as FeN, FeCoZrO or FeAlN (each magnetic material has a small magnetostriction λ and maximum coercivity Hc and a saturated flux density of 1.9-2.0 T) is used to form a coating by a sputtering method, and the coating may be subjected to reactive ion etching (hereinafter, "RIE") or ion beam etching (hereinafter, "IBE").

Next, as shown in FIGS. 8(A), (B), an insulating film 34 made of alumina ($Al_2O_3$) is formed over the entire surface of the laminated body to a thickness of, for example, 1.0-1.5 µm. The surface is polished by CMP so that the first shield section 41 and upper yoke pole section 20 thickness is about 0.3-0.8 µm, for surface flattening treatment.

Next, an insulating film made of alumina ($Al_2O_3$) is formed over the entire surface of the laminated body to a thickness of about 0.2 µm, and an opening is formed at the location where the second shield section 42 is to be formed. This results in an insulating film 31 for insulation so that shorting does not occur between the thin-film coil 100 and the upper yoke pole section 20.

Next, a frame is formed on the insulating film 31, using an electrode film (not shown) made of a conductive material and employing photolithography, and then electroplating is carried out using the electrode film to form a plating layer made of Cu. The plating layer and the electrode film below it constitute the thin-film coil 100. The thin-film coil 100 are formed in contact with the upper yoke pole section 20 via the insulating film 31.

A frame is then formed by photolithography and a second shield section 42 is formed by frame plating (not shown). The second shield section 42 is formed using the same magnetic material as for the first shield section 41. The second shield section 42 and the thin-film coil 100 may also be formed in the opposite order.

Also, as shown in FIGS. 9(A), (B), a photoresist 101 is coated to cover the entire surface of the laminated body, and an insulating film made of alumina ($Al_2O_3$) is formed thereover, after which the entire surface is polished by CMP for flattening treatment of the surface. In this case, the polishing of the surface by CMP is carried out so that the thickness of the thin-film coil 100 and second shield section 42 is about 2.0-2.5 µm.

Next, an insulating film made of alumina ($Al_2O_3$) is formed covering the entire surface of the laminated body, to a thickness of about 0.2 µm, and then an opening is formed at the location where the second shield section 42 is to be formed. This results in an insulating film 32 for insulation so that shorting does not occur between the thin-film coil 100 and the third shield section 43.

When forming the third shield section 43 to a thickness of about 2-3 μm, a write shield layer 40 is formed opposing the magnetic pole tip 11 via the recording gap layer 24, in connection with the upper yoke pole section 20, to obtain a thin-film magnetic head 300 as shown in FIGS. 1(A), (B). The thin-film magnetic head 300 obtained in this manner, having the construction described above, has improved recording density while effectively preventing appearance of pole erasure.

Modification Example

Figures 25A, 25B:
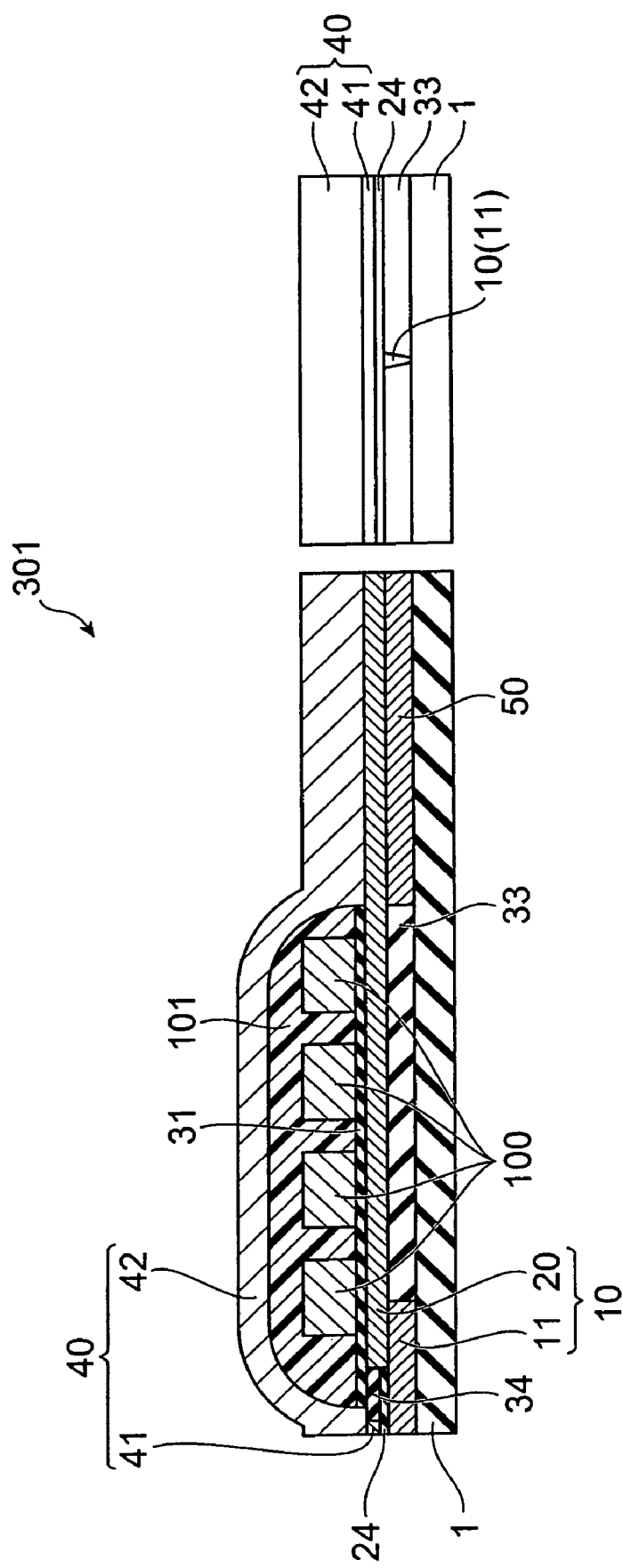

The manufacturing steps described above may be modified in the following manner. Specifically, as shown in FIGS. 7(A), (B), after the first shield section 41 and upper yoke pole section 20 have been formed, the thin-film coil 100 may be formed via the insulating film 31, before the second shield section 42. Next, a photoresist 101 may be formed covering the thin-film coil 100. The second shield section 42 is then formed covering the first shield section 41 and photoresist 101, in connection with the upper yoke pole section 20. This yields a thin-film magnetic head 301 including a write shield layer 40 having a first shield section 41 and second shield section 42, not having a third shield section 43, as shown in FIGS. 25(A), (B).

This thin-film magnetic head 301 differs from the thin-film magnetic head 300 in that it has no third shield section 43, but it otherwise has the same construction and exhibits the same function and effect as the thin-film magnetic head 300. Also, since it does not require an another step to manufacture the third shield section 43 in addition to the second shield section 42, the manufacturing steps can be reduced.

Second Embodiment

Figure 10A:
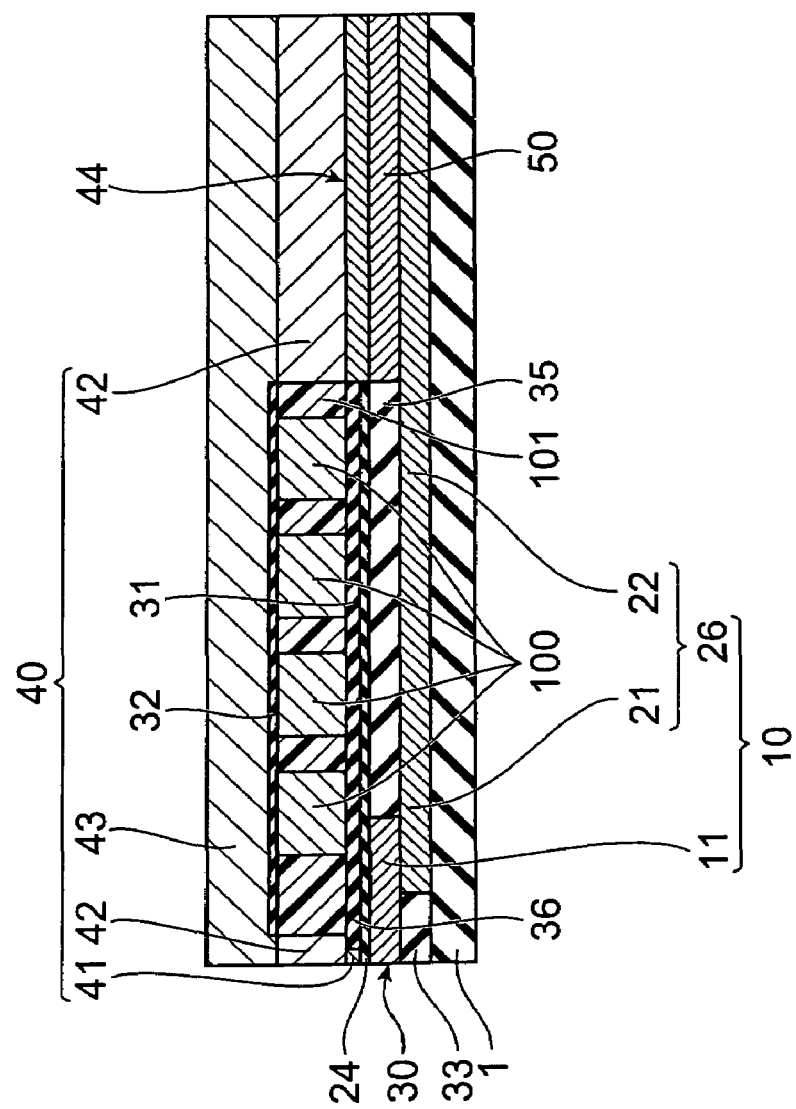
FIG. 10(A) is a cross-sectional view of a thin-film magnetic head according to a second embodiment of the invention, in the direction crossing the thin-film coil.
Figure 10B:
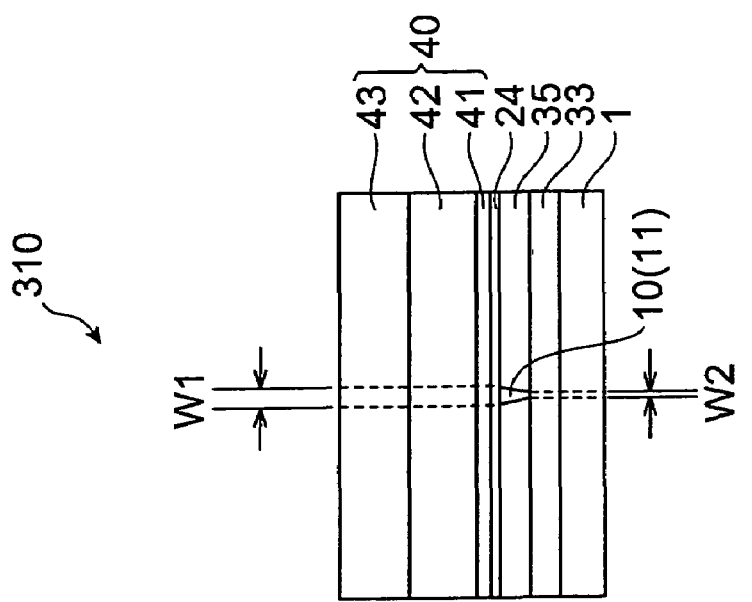
FIG. 10(B) is a front view showing the ABS.

A thin-film magnetic head according to a second embodiment of the invention will now be explained with reference to FIGS. 10(A), (B). FIG. 10(A) is a cross-sectional view of the thin-film magnetic head 310 according to the second embodiment of the invention, in the direction crossing the thin-film coil, and FIG. 10(B) is a front view showing the ABS.

(Structure of Thin-Film Magnetic Head)

The thin-film magnetic head 310 according to the second embodiment of the invention differs from the thin-film magnetic head 300 described above primarily in that the main pole layer 10 has a lower yoke pole section 26 instead of an upper yoke pole section 20. It also differs in that it has insulating films 35,36 instead of insulating films 31,34, and in that the shape of the write shield layer 40 is different, but is the same in its other aspects. The differences will now be explained, ignoring the aspects which are identical.

The main pole layer 10 in the thin-film magnetic head 310 has a lower yoke pole section 26. The lower yoke pole section 26 differs from the upper yoke pole section 20 in that it is situated at a position more distant from (below) the thin-film coil 100 than the main pole layer 10, while the other aspects of the construction are identical. Specifically, the lower yoke pole section 26 also has a variable width region 21 and a fixed width region 22, and a region of a certain size at the ABS 30 side is a stitched AREA 23. Also, the positions of the insulating layer 33, first shield section 41 and back magnetic pole layer 50 are altered to correspond to the lower yoke pole section 26.

An insulating film 35 is formed between the recording gap layer 24 and the lower yoke pole section 26. An insulating film 36 is also formed between the recording gap layer 24 and the thin-film coil 100.

The thin-film magnetic head 310 having this construction also has the stitched AREA 23 joined to the connector 12 of the magnetic pole tip 11 of the lower yoke pole section 26, and therefore, like the thin-film magnetic head 300, the direction of the remnant magnetization mr of the magnetic pole tip 11 after completion of writing is corrected by the magnetization ms of the lower yoke pole section 26, so that the direction of remnant magnetization mr is aligned in the same direction as the magnetization ms. Consequently, this thin-film magnetic head 310 can also have improved recording density while effectively preventing appearance of pole erasure.

Modification Example 1

The thin-film magnetic head 310 may also have a tensile film 52 between the insulating layer 1 and the lower yoke pole section 26, as shown in FIGS. 21(A) and (B). The tensile film 52 is the same high tensile strength film as the tensile film 51, made of the same material as the tensile film 51. The lower yoke pole section 26 has a larger size than the magnetic pole tip 11, and therefore the magnetic charge of the lower yoke pole section 26 is larger than the magnetic charge of the magnetic pole tip 11, and the effect of the remnant magnetization of the lower yoke pole section 26 is that much more notable in the thin-film magnetic head 310. However, by providing the tensile film 52 it is possible to maintain the direction of remnant magnetization mr of the lower yoke pole section 26 after completion of writing in the direction along the ABS 30, to allow appearance of pole erasure to be effectively prevented.

Incidentally, though not shown in this drawing, a tensile film may also be provided between the magnetic pole tip 11 and the insulating layer 33. This will also allow the direction of remnant magnetization of the magnetic pole tip 11 to be maintained in the direction along the ABS 30.

Modification Example 2

Figure 24:
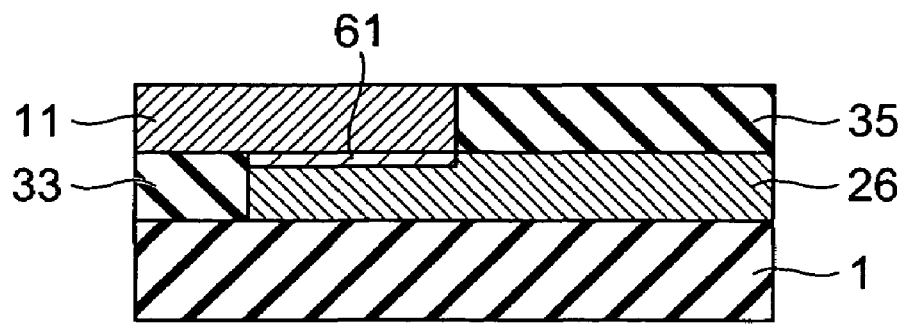
FIG. 24 is a cross-sectional view showing another modification to the thin-film magnetic head of the second embodiment of the invention.

The thin-film magnetic head 310, like the thin-film magnetic head 300, may have a non-magnetic film 61 between the magnetic pole tip 11 and lower yoke pole section 26, as shown in FIG. 24. With this non-magnetic film 61, it is possible to prevent the direction of remnant magnetization mr of the magnetic pole tip 11 from being directed in the different direction. Thus, the thin-film magnetic head 310 can have improved recording density while even more effectively preventing appearance of pole erasure.

(Method of Manufacturing Thin-Film Magnetic Head)

Figures 11A, 11B:
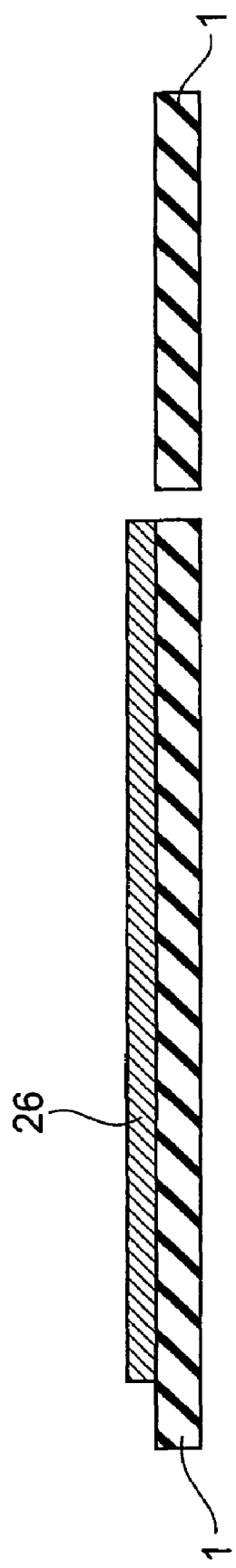
FIGS. 11(A) and (B) are cross-sectional views, corresponding to FIGS. 10(A) and (B), for a step of manufacturing a thin-film magnetic head according to the second embodiment.

A method of manufacturing the thin-film magnetic head 310 according to the second embodiment having the construction described above will now be explained with reference to FIGS. 10(A), (B) and FIGS. 11(A), (B) to FIGS. 15(A), (B). FIGS. 11(A), (B) to FIGS. 15(A), (B) show cross-sectional views of manufacturing steps corresponding to FIGS. 10(A), (B), respectively.

In this embodiment, similar to the first embodiment, an insulating layer 1 is formed on a substrate (not shown) to a thickness of, for example, about 0.2-0.3 μm.

Next, as shown in FIGS. 11(A), (B), a lower yoke pole section 26 is formed on the insulating layer 1 so that an insulating section 33 is formed at the ABS 30 side. The lower yoke pole section 26 is formed to a thickness of about 0.3-1.0 μm by a plating method, using as the magnetic material NiFe having a saturated flux density of 1.6 T or CoNiFe having a saturated flux density of 1.9-2.1 T and a small magnetostriction λ and maximum coercivity Hc. Alternatively, instead of plating, the lower yoke pole section 26 may be formed by first forming a coating by sputtering using a magnetic material such as FeN, FeCoZrO or FeAlN (each magnetic material having a small magnetostriction λ and maximum coercivity Hc and a saturated flux density of 1.9-2.0 T), and subjecting the coating to RIE or IBE.

Next, in the same manner as the first embodiment, a resist pattern with a taper angle of 5-12° is formed, and the resist pattern is used for plating with CoFeN or CoNiFe as the magnetic material having a high saturated flux density of 2.3 T-2.4 T to a thickness of about 0.6-0.8 μm, to form a magnetic pole tip 11 and back magnetic pole layer 50. The electrode film (not shown) formed for the plating is then removed, leaving the condition shown in FIGS. 12(A), (B). Here, the magnetic pole tip 11 is situated at the ABS 30 side, in contact with the insulating section 33, and joined at the ABS 30 (stitched AREA 23) side of the lower yoke pole section 26. Formation of the lower yoke pole section 26 results in formation of a main pole layer 10.

Next, as shown in FIGS. 13(A), (B), an insulating film 35 made of alumina ($Al_2O_3$) is formed over the entire surface of the laminated body to a thickness of, for example, 0.5-1.0 μm. The surface is polished by CMP so that the magnetic pole tip 11 and back magnetic pole layer 50 thickness is about 0.2-0.3 μm, for surface flattening treatment. Annealing may be carried out in the same manner as the first embodiment, either before or after the polishing by CMP, or after formation of the recording gap layer 24 described hereunder.

Also, a coating is formed over the entire top surface of the laminated body to 400-500 Å, to form a recording gap layer 24, using the same material as in the first embodiment, and the coating is selectively etched to expose a section of the side distant from the ABS 30. This forms the recording gap layer 24.

Also, as shown in FIGS. 14(A), (B), the same magnetic material in the first embodiment is used to form a first shield section 41 at a position which determines the throat height TH, so that it opposes the magnetic pole section 11 via the recording gap layer 24 at the ABS 30. An insulating film 36 made of alumina ($Al_2O_3$) is then formed over the entire surface of the laminated body to a thickness of, for example, 1.0-1.5 μm. The surface is polished by CMP so that thickness of the first shield section 41 is about 0.3-0.6 μm, for surface flattening treatment.

Also, as shown in FIGS. 15(A), (B), a frame is formed on the insulating film 36, using an electrode film (not shown) made of a conductive material and employing photolithography, and then electroplating is carried out using the electrode film to form a plating layer made of Cu. This step accomplishes formation of the thin-film coil 100 by the plating layer and the electrode film below it, which are in contact with the recording gap layer 24 via the insulating film 36.

A frame is then formed by photolithography and a second shield section 42 is formed by frame plating (not shown). The second shield section 42 is formed using the same magnetic material as for the first shield section 41. The second shield section 42 and the thin-film coil 100 may also be formed in the opposite order.

Also, a photoresist 101 is coated to cover the entire surface of the laminated body, and then an insulating film made of alumina ($Al_2O_3$) is formed thereover (not shown), after which the entire surface is polished by CMP for flattening treatment of the surface. In this case, the polishing of the surface by CMP is carried out so that the thickness of the thin-film coil 100 and second shield section 42 is about 2.0-2.5 μm. The procedure is afterwards accomplished by the same steps as for the first embodiment, to obtain a thin-film magnetic head 310 as shown in FIGS. 10(A), (B).

Modification Example

The manufacturing steps described above may be modified in the following manner. Specifically, as shown in FIGS. 14(A), (B), the thin-film coil 100 is formed after the first shield section 41 has been formed, and before the second shield section 42. Next, a photoresist 101 is formed covering the thin-film coil 100. The second shield section 42 is then formed covering the first shield section 41 and photoresist 101. This yields a thin-film magnetic head 311 including a write shield layer 40 having a first shield section 41 and second shield section 42, and not having a third shield section 43, as shown in FIGS. 26(A), (B).

This thin-film magnetic head 311 differs from the thin-film magnetic head 310 in that it has no third shield section 43, but it otherwise has the same construction and exhibits the same function and effect as the thin-film magnetic head 310. Also, since it does not require an another step to manufacture the third shield section 43 in addition to the second shield section 42, the manufacturing steps can be reduced.

Third Embodiment

Figures 16A, 16B:
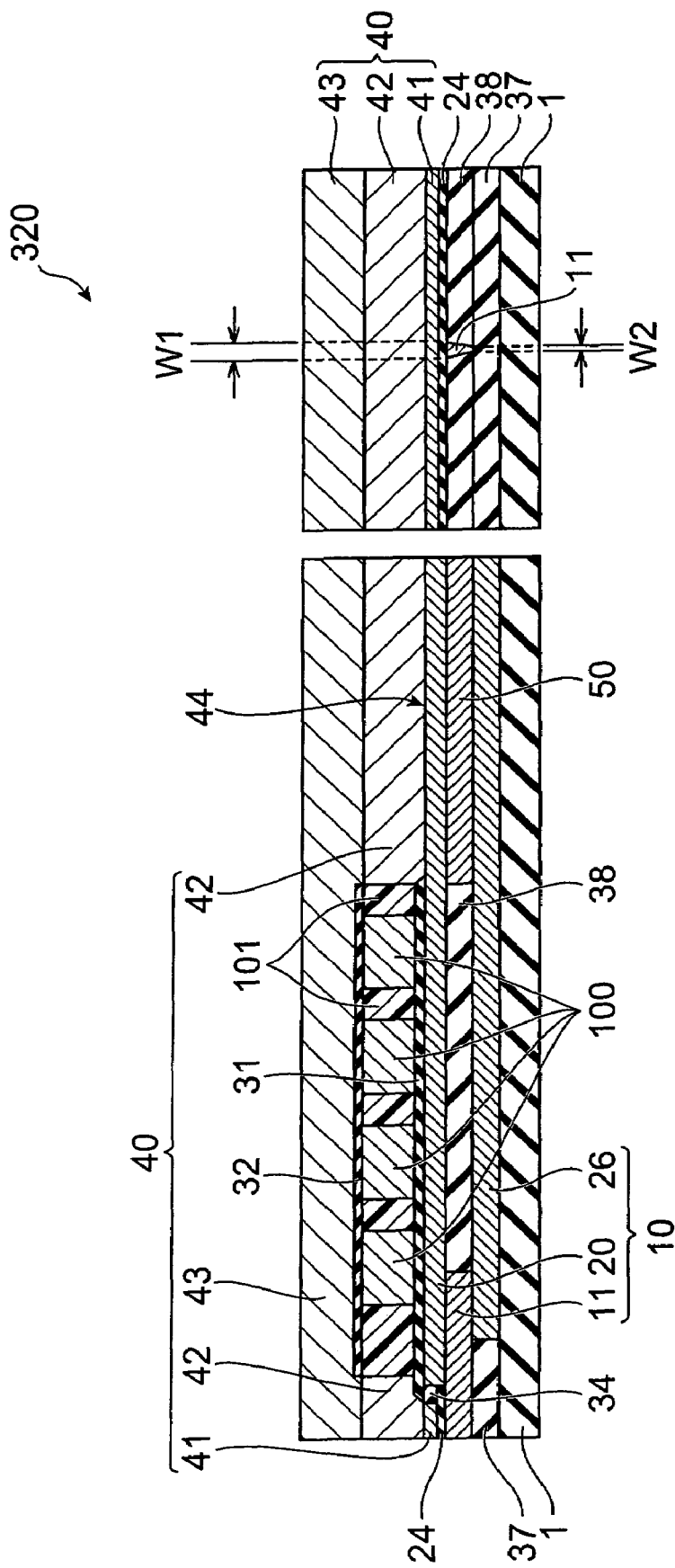
FIG. 16(A) is a cross-sectional view of a thin-film magnetic head according to a third embodiment of the invention, in the direction crossing the thin-film coil.

A thin-film magnetic head according to a third embodiment of the invention will now be explained with reference to FIGS. 16(A), (B). FIG. 16(A) is a cross-sectional view of the thin-film magnetic head 320 according to the third embodiment of the invention, in the direction crossing the thin-film coil, and FIG. 16(B) is a front view showing the ABS.

(Structure of Thin-Film Magnetic Head)

The thin-film magnetic head 320 according to the third embodiment of the invention differs from the thin-film magnetic head 300 described above primarily in that, in addition to the same lower yoke pole section 26 as the thin-film magnetic head 310 of the second embodiment, it also has first and second insulating sections 37,38. The differences will now be explained, omitting or simplifying the aspects which are identical.

The thin-film magnetic head 320 according to the third embodiment has a lower yoke magnetic section 26, and therefore the main pole layer 10 is formed by joining the upper yoke pole section 20 and lower yoke pole section 26 near to and distant from the magnetic pole tip 11, via the thin-film coil 100. The joining forms a region of a certain size at the ABS 30 side as the stitched AREA 23 for both the upper yoke pole section 20 and lower yoke pole section 26.

The thin-film magnetic head 320 having this construction also has the stitched AREA 23 of the upper yoke pole section 20 and lower yoke pole section 26 joined to the magnetic pole tip 11, and therefore, like the thin-film magnetic head 300 and thin-film magnetic head 310, the direction of the remnant magnetization mr is of the magnetic pole tip 11 after completion of writing is corrected by the magnetization ms of the upper yoke pole section 20 and lower yoke pole section 26, so that the direction of remnant magnetization mr is aligned in the same direction as the magnetization ms. Consequently, this thin-film magnetic head 320 can also have improved recording density while effectively preventing appearance of pole erasure.

In particular, since the thin-film magnetic head 320 has both the upper yoke pole section 20 and lower yoke pole section 26 joined to the magnetic pole tip 11, correction of the direction of remnant magnetization mr by the magnetization ms is accomplished on both sides of the main pole layer 10. Correction of the direction of remnant magnetization mr is therefore more effectively achieved than with the thin-film magnetic head 300.

Modification Example

The thin-film magnetic head 320 may also have the same tensile film 52 as for the thin-film magnetic head 310, as shown in FIGS. 22(A) and (B). This will allow the direction of remnant magnetization mr of the lower yoke pole section 26 after completion of writing to be maintained in the direction along the ABS 30, to allow appearance of pole erasure to be effectively prevented.

(Method of Manufacturing Thin-Film Magnetic Head)

Figures 17A, 17B:
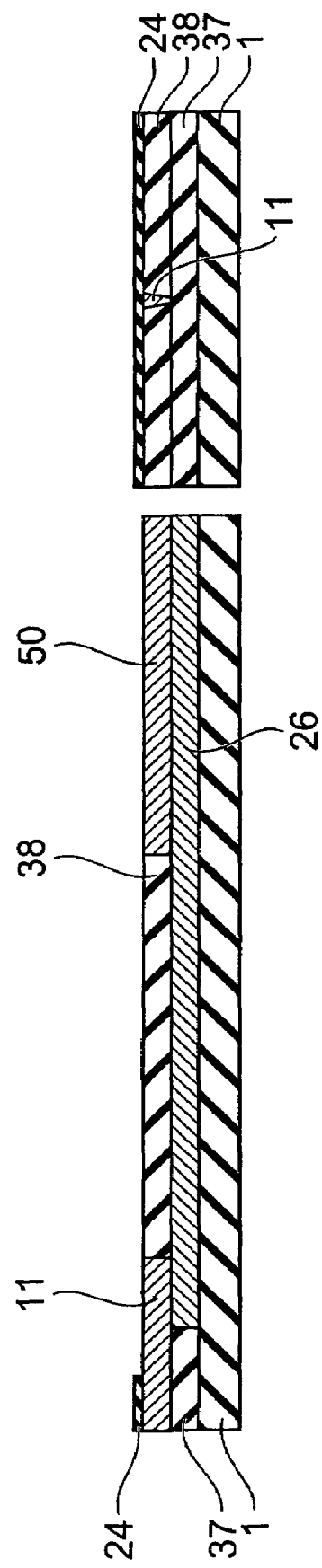
FIGS. 17(A) and (B) are cross-sectional views, corresponding to FIGS. 16(A) and (B), for a step of manufacturing a thin-film magnetic head according to the third embodiment.

A method of manufacturing the thin-film magnetic head 320 according to the third embodiment having the construction described above will now be explained with reference to FIGS. 16(A), (B) and FIGS. 17(A), (B) to FIGS. 19(A), (B). FIGS. 17(A), (B) to FIGS. 19(A), (B) show cross-sectional views of manufacturing steps corresponding to FIGS. 16(A), (B), respectively.

First, the steps shown in FIGS. 11(A), (B) to FIGS. 12(A), (B) may be carried out in the same manner as for the thin-film magnetic head 310 according to the second embodiment. (However, instead of the insulating section 33 there is formed the first insulating section 37 of the invention, and the second insulating section 38 is formed at the side more distant from the ABS 30 than the magnetic pole tip 11. Also, either before or after the polishing by CMP, and after formation of the recording gap layer 24 described hereunder, the surface of the magnetic pole tip 11 may be subjected to annealing in the same manner as the first and second embodiments.)

Next, as shown in FIGS. 17(A), (B) a coating is formed over the entire top surface of the laminated body to 400-500 Å using the same material as for the first embodiment, to form a recording gap layer 24, and the coating is selectively etched to expose the side distant from the ABS 30 of the magnetic pole tip 11. This results in formation of a recording gap layer 24 on the magnetic pole tip 11.

Also, as shown in FIGS. 18(A), (B), the entire surface of the laminated body is plated by a plating method using the same magnetic material as for the first embodiment, to form an upper yoke magnetic section 20 in such a manner as to be joined in contact with the location not covered by the recording gap layer 24 of the magnetic pole tip 11, and with the back magnetic pole layer 50, and also so that it is in contact with the second insulating section 38. Formation of the upper yoke pole section 20 results in formation of the main pole layer 10.

Also, a first shield section 41 is formed at a position which determines the throat height TH, so that it opposes the magnetic pole section 11 via the recording gap layer 24 at the ABS 30. The first shield section 41 may also be formed by a plating method using the same magnetic material as for the first embodiment, but it may also be formed by forming a coating by sputtering and then subjecting the coating to RIE or IBE.

Next, in the same manner as the first embodiment, an insulating film 34 made of alumina ($Al_2O_3$) is formed over the entire surface of the laminated body to a thickness of, for example, about 1.0-1.5 μm and the surface is polished by CMP so that the first shield section 41 and upper yoke pole section 20 thickness is about 0.3-0.6 μm, for surface flattening treatment.

Figure 19A:
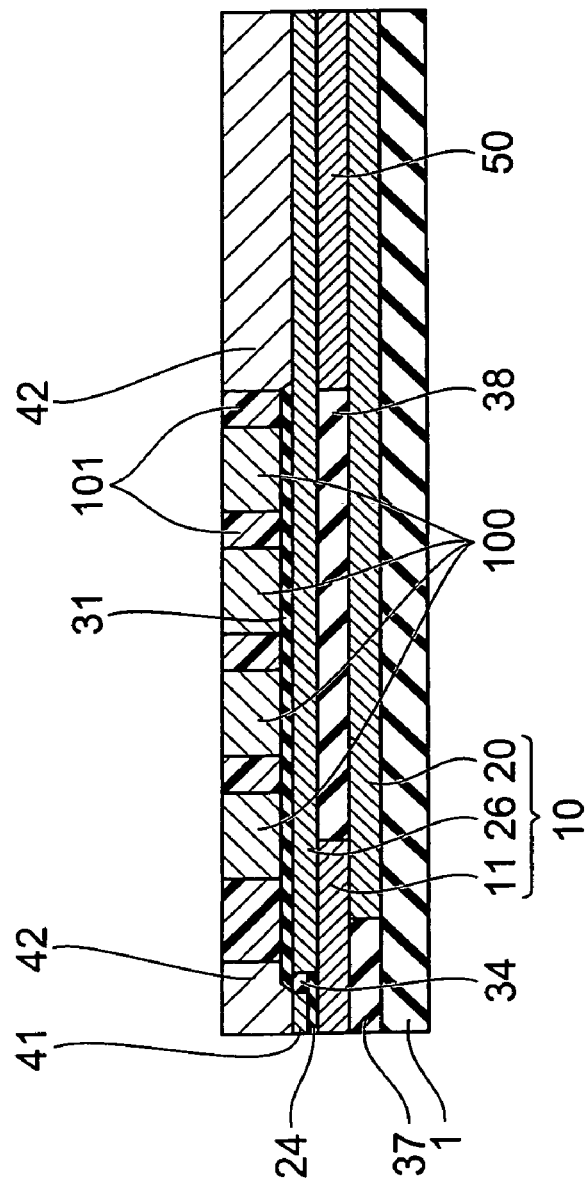
FIGS. 19(A) and (B) are cross-sectional views showing the steps subsequent to FIGS. 18(A) and (B), respectively.
Figure 19B:
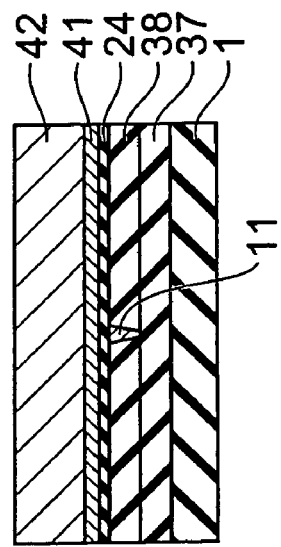

Next, an insulating film made of alumina ($Al_2O_3$) is formed over the entire surface of the laminated body to a thickness of about 0.2 μm in the same manner as the first embodiment, as shown in FIGS. 19(A), (B), and an opening is formed at the location where the second shield section 42 is to be formed, to form an insulating film 31.

The procedure is afterwards carried out in the same manner as for the first embodiment, for formation of thin-film coil 100, a second shield section 42, insulating film 32 and third shield section 43, to obtain a thin-film magnetic head 320 as shown in FIGS. 16(A), (B). Since the thin-film magnetic head 320 obtained in this manner has the construction described above, it has improved recording density while effectively preventing appearance of pole erasure.

Fourth Embodiment

Figure 27:
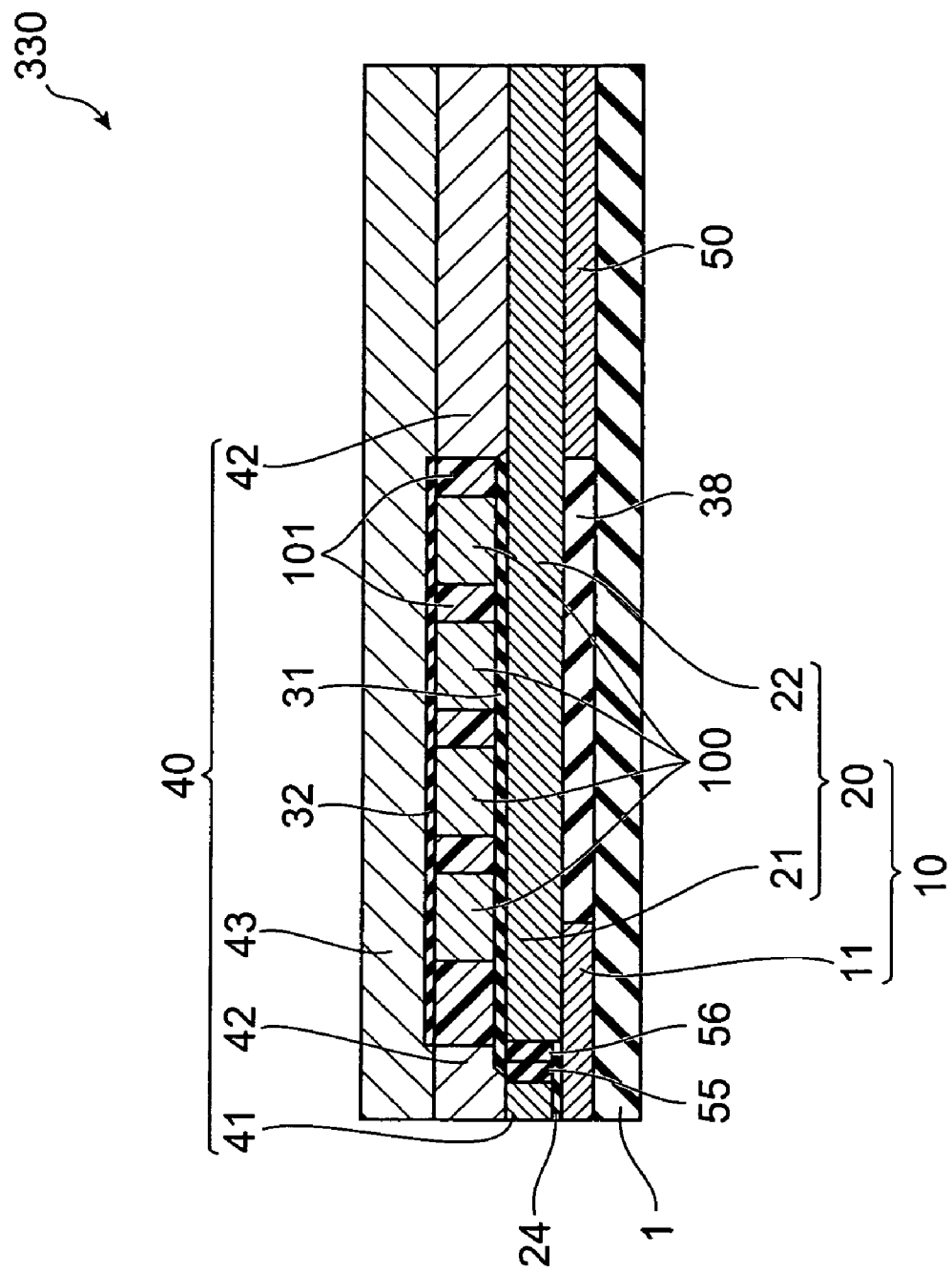
FIG. 27 is a cross-sectional view of a thin-film magnetic head according to a fourth embodiment of the invention, in the direction crossing the thin-film coil.

A thin-film magnetic head according to a fourth embodiment of the invention will now be explained with reference to FIG. 27. FIG. 27 is a cross-sectional view of a thin-film magnetic head 330 according to the fourth embodiment of the invention, in the direction crossing the thin-film coil.

(Structure of Thin-Film Magnetic Head)

The thin-film magnetic head 330 of the fourth embodiment differs from the thin-film magnetic head 300 described above in that it has insulating films 55,56 instead of the insulating film 34, and in that the material of the first shield section 41 is different, but it is identical in its other aspects. The differences will now be explained, omitting or simplifying the aspects which are identical.

In the thin-film magnetic head 300 described above, the upper yoke pole section 20 and first shield section 41 are formed in the same step using the same magnetic material, and therefore the saturated flux density of the magnetic material of the first shield section 41 is the same as the saturated flux density of the upper yoke pole section 20.

However, in order to reduce the effect of remnant magnetization after completion of writing, it is preferred for the saturated flux density of the first shield section 41 formed at the ABS 30 side to be low. The first shield section 41 and upper yoke pole section 20 are therefore formed using different magnetic materials, so that the saturated flux density of the first shield section 41 is at least lower than the main pole layer 10, and preferably lower than the upper yoke pole section 20.

The magnetic material of the first shield section 41 may be NiFe with a saturated flux density of 1.6 T, and NiFe with a saturated flux density of 1.0 T (80%:20%). Alternatively, the magnetic material of the first shield section 41 may be CoNiFe with a saturated flux density of 1.9 T, and CoFe or CoNiFe having a high saturated flux density of 2.3 T-2.4 T as the main pole layer 10, while the saturated flux density of the upper yoke pole section 20 may be the same as, or slightly lower than, the main pole layer 10 (for example, about 1.9 T).

The insulating films 55,56 are formed at a location of the recording gap layer 24 which is more distant from the ABS 30 than the first shield section 41.

(Method of Manufacturing Thin-Film Magnetic Head)

A method of manufacturing the thin-film magnetic head 330 according to the fourth embodiment having the construction described above will now be explained with reference to FIG. 27 above, as well as FIGS. 28 and 29.

Figure 28:
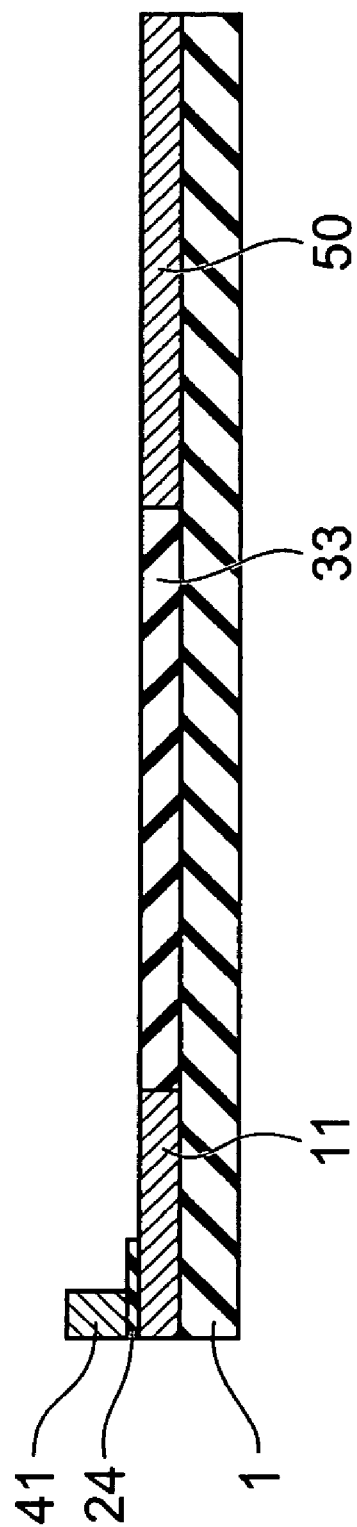
FIG. 28 is a cross-sectional view, corresponding to FIG. 17, for a step of manufacturing a thin-film magnetic head according to the fourth embodiment.
Figure 29:
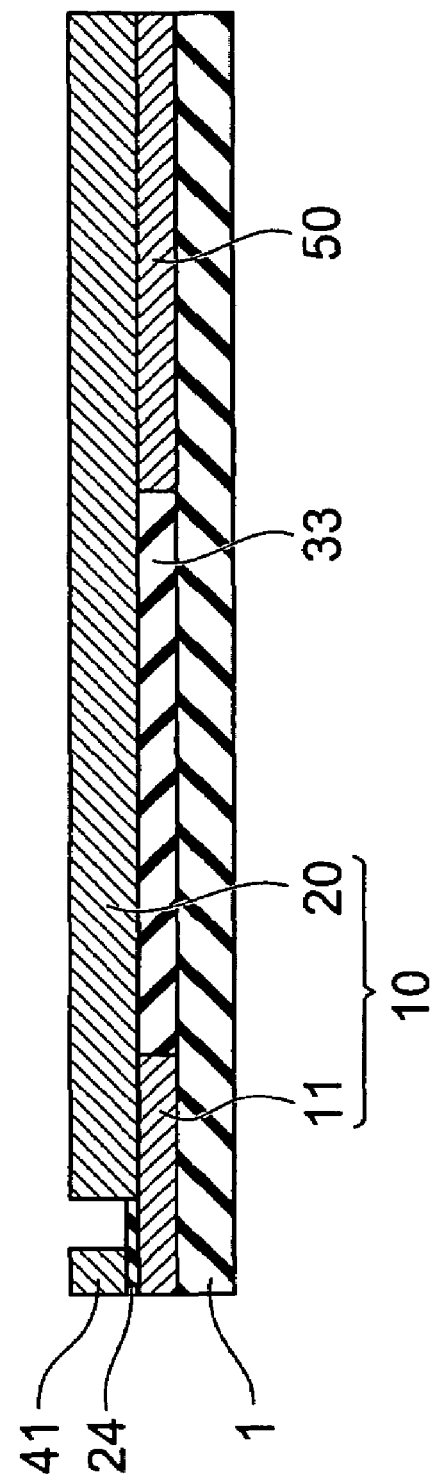
FIG. 29 is a cross-sectional view showing the step subsequent to FIG. 28.

As shown in FIGS. 28 and 29, in the thin-film magnetic head 330, a magnetic pole tip 11, back magnetic pole layer 50 and insulating layer 33 are formed in the same manner as the first embodiment, and then a recording gap layer 24 is formed. Next, as explained above, a magnetic material with a saturated flux density at least lower than the main pole layer 10 and preferably lower than the upper yoke pole section 20 (for example, NiFe with a saturated flux density of 1.0 T (80%: 20%)) is used to form a first shield section 41 at a position which determines the throat height TH, so that it opposes the magnetic pole section 11 via the recording gap layer 24 at the ABS 30.

Next, as shown in FIG. 29, an upper yoke pole section 20 is formed so that it is joined to the location of the magnetic pole tip 11 which is not covered with the recording gap layer 24, and to the back magnetic pole layer 50, and so that it is in contact with the insulating section 33. The remaining steps are carried out in the same manner as for the first embodiment.

At least the surface of the magnetic pole tip 11 of the main pole layer 10 is subjected to annealing.

The present invention may also be applied for a record-only head having only an inductive electromagnetic transducer, and it may be applied for a thin-film magnetic head wherein recording and reproduction are accomplished by an inductive electromagnetic transducer.

(Embodiments of Head Gimbal Assembly and Hard Disk Drive Will Now be Explained)

Figure 30:
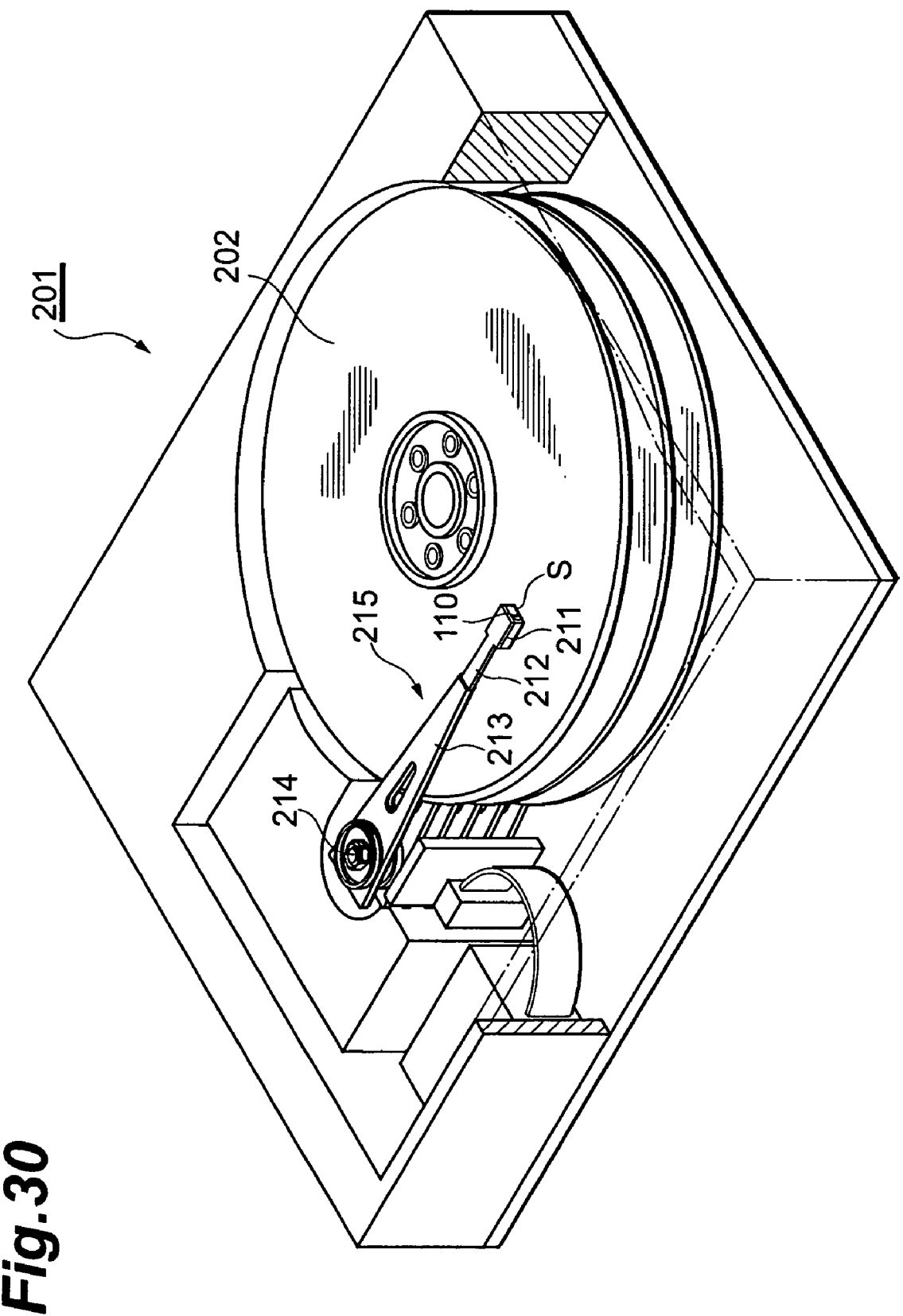
FIG. 30 is a perspective view of a hard disk drive provided with a thin-film magnetic head according to the first embodiment of the invention.

FIG. 30 is a perspective view showing a hard disk drive 201 comprising the above-mentioned thin-film magnetic head 300. The hard disk drive 201 comprises a hard disk (recording medium) 202 rotating at a high speed, and a head gimbal assembly (HGA) 215. The hard disk drive 201 is an apparatus for actuating the HGA 215, so that magnetic information is recorded onto and reproduced from recording surfaces of the hard disk 202. The hard disk 202 comprises a plurality of disks (whose number is 3 in the drawing). Each disk has a recording surface opposing the thin-film magnetic head 300. The HGA 215 comprises a gimbal 212 mounted with a head slider 211 having a support formed with the thin-film magnetic head 300 and a suspension arm 213 for supporting the gimbal 212 which are disposed on the recording surface of each disk, and is rotatable about a shaft 214 by a voice coil motor which is not depicted, for example. As the HGA 215 is rotated, the head slider 211 moves radially of the hard disk 202, i.e., in directions traversing track lines.

Since the HGA 215 and hard disk drive 201 have thin-film magnetic heads 300, it is possible to achieve improved recording density while effectively preventing appearance of pole erasure. An HGA 215 and hard disk drive 201 having thin-film recording heads according to the second, third and fourth embodiments can likewise achieve improved recording density while effectively preventing appearance of pole erasure.

It is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head having a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, wherein said main pole layer comprises said magnetic pole tip with a shortened structure which is not connected to said write shield layer, and a yoke pole section away from said medium-opposing surface with a larger size than said magnetic pole tip, and comprises a joined structure wherein said yoke pole section is flat and is joined to a section at the side away from the medium-opposing surface excluding the side of the medium-opposing surface of said magnetic pole tip, and an insulating film layer disposed between said magnetic pole tip and the thin-film coil, the insulating film layer being laminated between said yoke pole section and the thin-film coil, a section at the side of the medium-opposing surface of the thin-film coil being laminated on said magnetic pole tip, and the insulating film of the insulating film layer having uniform thickness.

2. A thin-film magnetic head according to claim 1, wherein said magnetic pole tip has a connector away from said medium-opposing surface with a variable width structure which the width gradually widens with its distance from said medium-opposing surface, and said the yoke pole section is joined to said connector.

3. A thin-film magnetic head according to claim 2, further comprising a non-magnetic thin-film comprising a non-magnetic material situated between said connector and said yoke pole section.

4. A thin-film magnetic head according to claim 1, wherein said magnetic pole tip and said yoke pole section are formed using magnetic materials with different saturated flux densities, and the saturated flux density of said magnetic pole tip is set higher than the saturated flux density of said yoke pole section.

5. A thin-film magnetic head according to claim 1, wherein said write shield layer and said yoke pole section are formed using magnetic materials with different saturated flux densities, and the saturated flux density of said write shield layer is set lower than the saturated flux density of said yoke pole section.

6. A thin-film magnetic head according to claim 1, further comprising a high tensile strength film made of Ta, W, Mo, TiW, TiN, Cr, NiCr, Mo, Ru or SIN in contact with either or both said magnetic pole tip and said yoke pole section.

7. A thin-film magnetic head according to claim 2, wherein said magnetic pole tip comprises a track width specifier with a narrower track width than the connector, said track width specifier is disposed between said medium-opposing surface and said connector, said yoke pole section is not joined to said track width specifier.

8. A thin-film magnetic head according to claim 2, wherein said magnetic pole tip comprises a track width specifier with a narrower track width than the connector, said track width specifier is disposed between said medium-opposing surface and said connector, said yoke pole section is further away from said medium-opposing surface than the track width specifier.

9. A thin-film magnetic head according to claim 2, wherein said magnetic pole tip and said yoke pole section are formed using magnetic materials with different saturated flux densities, and the saturated flux density of said magnetic pole tip is set higher than the saturated flux density of said yoke pole section.

10. A thin-film magnetic head having a mutually laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, wherein said main pole layer comprises said magnetic pole tip with a shortened structure which is not connected to said write shield layer, an upper yoke pole section away from said medium-opposing surface with a larger size than said magnetic pole tip and situated at a position closer to said thin-film coil than said magnetic pole tip, and a lower yoke pole section away from said medium-opposing surface with a larger size than said magnetic pole tip and situated at a position distant from said thin-film coil than said magnetic pole tip, and has a joined structure wherein said upper yoke pole section and lower yoke pole section are flat and are joined to a section at the side away from the medium-opposing surface excluding the side of the medium-opposing surface of said magnetic pole tip, an insulating film layer disposed between said magnetic pole tip and the thin-film coil, the insulating film layer being laminated between said yoke pole section and the thin-film coil, a section at the side of the medium-opposing surface of the thin-film coil being laminated on said magnetic pole tip, and the insulating film of the insulating film layer having uniform thickness.

11. A thin-film magnetic head according to claim 10, wherein said magnetic pole tip has a connector away from said medium-opposing surface with a variable width structure which the width gradually widens with its distance from said medium-opposing surface, and said upper yoke pole section and lower yoke pole section are joined to said connector.

12. A thin-film magnetic head according to claim 11, wherein said magnetic pole tip and said upper and lower yoke pole sections are formed using magnetic materials with different saturated flux densities, and the saturated flux density of said magnetic pole tip is set higher than the saturated flux densities of said upper and lower yoke pole sections.

13. A thin-film magnetic head according to claim 10, wherein said magnetic pole tip and said upper and lower yoke pole sections are formed using magnetic materials with different saturated flux densities, and the saturated flux density of said magnetic pole tip is set higher than the saturated flux densities of said upper and lower yoke pole sections.

14. A thin-film magnetic head according to claim 10, further comprising a high tensile strength film in contact with either or both said magnetic pole tip and said lower yoke pole section.

15. A head gimbal assembly comprising a thin-film magnetic head formed on a support and a gimbal securing the support, wherein said thin-film magnetic head has a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, wherein said main pole layer comprises said magnetic pole tip with a shortened structure which is not connected to said write shield layer, and a yoke pole section away from said medium-opposing surface with a larger size than said magnetic pole tip, and comprises a joined structure wherein said yoke pole section is flat and is joined to a section at the side away from the medium-opposing surface excluding the side of the medium-opposing surface of said magnetic pole tip, and an insulating film layer disposed between said magnetic pole tip and the thin-film coil, the insulating film layer being laminated between said yoke pole section and the thin-film coil, a section at the side of the medium-opposing surface of the thin-film coil being laminated on said magnetic pole tip, and the insulating film of the insulating film layer having uniform thickness.

16. A hard disk drive comprising a head gimbal assembly having a thin-film magnetic head and a recording medium opposing said thin-film magnetic head;

wherein said thin-film magnetic head has a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, wherein said main pole layer comprises said magnetic pole tip with a shortened structure which is not connected to said write shield layer, and a yoke pole section away from said medium-opposing surface with a larger size than said magnetic pole tip, and comprises a joined structure wherein said yoke pole section is flat and is joined to a section at the side away from the medium-opposing surface excluding the side of the medium-opposing surface of said magnetic pole tip, and an insulating film layer disposed between magnetic pole tip and the thin-film coil, the insulating film layer being laminated between said yoke pole section and the thin-film coil, a section at the side of the medium-opposing surface of the thin-film coil being laminated on said magnetic pole tip, and the insulating film of the insulating film layer having uniform thickness.

* * * * *